US010586290B2

(12) United States Patent
Brockie et al.

(10) Patent No.: US 10,586,290 B2
(45) Date of Patent: Mar. 10, 2020

(54) INTEGRATED HIPAA-COMPLIANT COMPUTER SECURITY SYSTEM FOR AUTHORIZING, DOCUMENTING, VERIFYING, BILLING AND ADJUDICATING LONG TERM SERVICES AND SUPPORTS, INCLUDING INDIVIDUAL BUDGETING

(71) Applicant: Therap Services, LLC, Waterbury, CT (US)

(72) Inventors: Justin Mark Brockie, Wolcott, CT (US); Md. Asif Ali, Dacca (BD); A.S. M. Omar Faruq, Rocky Hill, CT (US); James Michael Kelly, Woodbury, CT (US); Sazzad Rafique, Rocky Hill, CT (US); Richard Allen Robbins, New York, NY (US)

(73) Assignee: Therap Services, LLC, Waterbury, CT (US)

( * ) Notice: Subject to any disclaimer, the term of this patent is extended or adjusted under 35 U.S.C. 154(b) by 612 days.

(21) Appl. No.: 15/197,120

(22) Filed: Jun. 29, 2016

(65) Prior Publication Data

US 2016/0314541 A1    Oct. 27, 2016

Related U.S. Application Data

(63) Continuation-in-part of application No. 13/675,440, filed on Nov. 13, 2012.

(Continued)

(51) Int. Cl.
*G06Q 40/00* (2012.01)
*G06Q 30/04* (2012.01)
*H04L 29/06* (2006.01)

(52) U.S. Cl.
CPC ............ *G06Q 40/12* (2013.12); *G06Q 30/04* (2013.01); *H04L 63/102* (2013.01); *H04L 63/104* (2013.01)

(58) Field of Classification Search
CPC ......... G06Q 10/00–20/00; G06Q 99/00; G06F 7/00; G06F 7/04; G06F 19/00
See application file for complete search history.

(56) References Cited

U.S. PATENT DOCUMENTS 7,490,048 B2 *  2/2009  Joao ..................... G06F 19/00
                                                             705/3
7,549,054 B2 *  6/2009  Brodie et al. ............ G06F 9/00
                                                             713/182

(Continued)

*Primary Examiner* — Michael Tomaszewski
*Assistant Examiner* — William T. Monticello
(74) *Attorney, Agent, or Firm* — Hughes Hubbard & Reed LLP

(57) ABSTRACT

Systems and methods for sharing billing information across at least two organizations in an integrated manner are described. A physical node may receive a request for authorization for a user in an organization to access an individual's information in another organization. The request may be logged. The physical node may determine whether the user is authorized to access the individual's information and, if it is, provide appropriate access. Also disclosed is an integrated web application and system which includes the core plan, budget, service authorizations, service documentation, claims, and communications of an individual under care and allows for calculated access and communication with external authorization and payment systems.

17 Claims, 35 Drawing Sheets

Related U.S. Application Data

(60) Provisional application No. 62/186,193, filed on Jun. 29, 2015.

(56) References Cited

U.S. PATENT DOCUMENTS

| | | | |
|---|---|---|---|
| 7,587,384 B2 * | 9/2009 | Vadrot et al. ............. | G06F 7/00 707/2 |
| 8,042,160 B1 * | 10/2011 | Boydstun et al. ........ | G06F 7/04 726/6 |
| 2006/0036468 A1 * | 2/2006 | Thomas et al. ........ | G06Q 99/00 705/1 |
| 2007/0162308 A1 * | 7/2007 | Peters .................... | G06Q 10/00 705/2 |

* cited by examiner

Figure 3

Individual Budgeting

IBA  Budget                              IBA Exception
Create  Create                           Search
Search  Search                           Draft (4)
        Draft (61)                       Pending Approval (4)
        Pending Approval (169)           Rejected
        Rejected (5)
        Pending Changes Approval (200+)
        Changes Rejected (24)
        Service Authorization Search Service Consumption(s)       IB Data Admin                   IBA Worksheet
Submitted Units (200+)       Service Consumption Search      IBA Worksheet
Service Consumption Search   Assign Service Auth Number      Create Funding Component
                             IBA Exception Category Create   Funding Component List
                             IBA Exception Category List     Create Funding Component Status
                                                             Funding Component Status List IB Share of Cost    Service Authorization
Create              Acknowledge (200+)
List                List

Figure 4

Individual List

Figure 7

Service Authorization
Mary April Active

| | | | |
|---|---|---|---|
| Duration: | 08/15/2015 - 12/31/2015 | ISA: | $30,000.00 |
| Status: | Draft | Funding Level: | |
| Form ID: | IB-TICT-078448D5YJDF6F | ICAP Score: | |
| Time Zone: | US/Central | Applicable ISA: | $30,000.00 |
| Oversight ID: | 06017958 | Total Exception Amount: | $0.00 |
| | | Total Amount: | $30,000.00 |
| | | Consumed Amount: | $0.00 |
| | | Remaining Amount: | $30,000.00 |

Service Authorization

| | |
|---|---|
| Service: | 113 - Respite In Home (non-specialized) |
| Service Provider: | Demo Service Provider |
| Service From Date: | 08/15/2015 |
| Service To Date: | 12/31/2015 |
| Total Unit(s): | 1000.00 |
| Rate type: | Daily Variable |
| Rate: | $10.00 |
| Deduct Customer Obligation: | Yes |
| Shareable with Provider: | Yes |

Mapping Information

| | |
|---|---|
| Mapped Therap Provider: | DEMO-NE (DEMO Service Provider) |
| Mapped Individual: | Mary April Active |

This will uniformly allocate total units across the month

This will allocate total units depending on the days of the month

Monthly Allocation

Allocate Total Units    Allocate Month Days

| Months | Aug-15 | Sep-15 | Oct-15 | Nov-15 | Dec-15 |
|---|---|---|---|---|---|
| Budgeted Unit(s) | 0.0 | 0.0 | 0.0 | 0.0 | 0.0 |

☐ Allocation(s) to Add  ☐ Allocation(s) to Delete

Back    Save

Figure 8

Review
Mary April Active

| | | | |
|---|---|---|---|
| Duration: | 08/15/2015 - 12/31/2015 | IBA: | $30,000.00 |
| Status: | Pending Approval | Funding Level: | |
| Form ID: | IB-TICT-D7M4ND6YJDF6F | ICAP Score: | |
| Time Zone: | US/Central | Applicable IBA: | $30,000.00 |
| Oversight ID: | 96017066 | Total Exception Amount: | $0.00 |
| | | Total Amount: | $30,000.00 |
| | | Consumed Amount: | $0.00 |
| | | Remaining Amount: | $30,000.00 |

Review

Comments*: The budgets meets all the requirements and needs to be approved.

Back → Save

Figure 9

IBA Exception

Update Detail(s)

| | |
|---|---|
| Created By: | Michael Ferguson, DD Service Coordination Supervisor on 05/21/2015 01:48 AM |
| Submitted By: | Michael Ferguson, DD Service Coordination Supervisor on 05/21/2015 02:15 AM |
| Last Updated By: | Michael Ferguson, DD Service Coordination Supervisor on 05/21/2015 02:15 AM |

Update History

Budget

Individual Name: Mary April Active

| | | | |
|---|---|---|---|
| Duration: | 08/15/2015 - 12/31/2015 | IBA: | $30,000.00 |
| Status: | Approved | Funding Level: | |
| Form ID: | IB-ODONE-07M4NO5YJDF9F | ICAP Score: | |
| Time Zone: | US/Central | Applicable IBA: | $30,000.00 |
| Oversight ID: | 08017066 | Total Exception Amount: | $0.00 |
| | | Total Amount: | $30,000.00 |
| | | Consumed Amount: | $0.00 |
| | | Remaining Amount: | $30,000.00 |

IBA Exception

| | |
|---|---|
| Description: | Enter description here ... |
| Status: | Pending Approval |
| Amount: | $1,000.00 |
| Begin Date: | 08/15/2015 |
| End Date: | 09/15/2015 |
| Category: | Exception |

Back          Edit   Delete   Approve   Reject   Add Review

Figure 11

Agency Wide and Administrative Roles

Administrative Roles
- ☐ Super Admin
- ☐ User
- ☐ Individual
- ☐ Provider Setup
- ☐ Activity Tracking
- ☐ Admin Report
- ☐ Supported Employment Tracking
- ☐ Caseload
- ☐ User Privilege
- ☐ Shared Contact
- ☐ Billing Module Roles
- ☐ Labtest Create
- ☐ ISP Program Template Submit
- ☐ ISP Program Template Approve
- ☐ ISP Program Template View
- ☐ CDS Admin
- ☐ Global AFT Library
- ☐ Report Library
- ☐ Global Care Plan Template Library
- ☑ IB Data Admin
- ☐ IB Provider Data Admin

Figure 12

| To Do | Modules | High | Medium | Low |
|---|---|---|---|---|
| Individual | Individual Data - Search | | | |
| Health | Worklist | | | 2 |
| | Emergency Data Form - Search | | | |
| Agency | Acknowledge Print | | | 10 |
| | Service Authorization | | | |
| Billing | Acknowledge | | | 43 |
| Admin | | | | |

Figure 14

Service Description/Code
Form ID: BDC-CBMONE-07N4HP4DPED6W

* Primary Diagnosis C...    7999
* Diagnosis Code Poi...
Used for IB

* Method of Data Collection    ○ Billing Data Input  ● Attendance
* Attendance Type    DEMO Attendance Type 1 ▼
  Select
  DEMO Attendance Type 1
  DEMO Attendance Type 2
  DEMO Attendance Type 3

Select Attendance as the method or data collection

Select Attendance as the method or data collection

Figure 15

| | Attendance | |
|---|---|---|
| To Do | | |
| Individual | Attendance | New | Search | Summary | Archive |
| Health | Professional Claim | |
| Agency | | |
| Billing | Billing Data | New | Search | Summary | Detail Report | ISP Billing | Archive |
| Admin | Service Authorization | New | Search | Archive |
| Agency Reports | Professional Claim | New | New (Using Template) | New Template | Send | Search | Template Search | Transaction Search | Archive |
| Individual Home Page | Report | Utilization | Unclaimed | Reconciliation | Denied Claim | Aging Report |
| Settings | Claim Submission | Send Claim |

Figure 17

Attendance

Program Site Id: 3009978-01005
Service Description (Code): Adult Dental Services(91130)
Attendance Type Name: Day Services
Start Date: April 01, 2015, End Date: April 01, 2015

April, 2015

Incomplete  In Prep  Approved  Submitted for Billing  New

Update  Approve  Generate Billing Data

Attendance Options: - Please Select -    Time In:
General Comment:                          Time Out:
                                          Service Provider: - Please Select -
250 characters left                       Non Billable: ☐

Incomplete

Record Data
from here

☐ Select All Attendance

Figure 19

Service Consumption

Update Detail(s)

Created By: Stacey Hernandez, -None- on 05/20/2015 02:26 AM
Submitted By: Sophia Hayes, Other On 05/20/2015 05:37 AM
Accepted By: Ethan Thomas, DO Service Coordination Supervisor On 05/20/2015 02:33 AM

Service Consumption(s)

Individual Name: Mary Active
Date of Birth: 06/09/1967
Oversight ID: 01876344
Service: 5335 - DEMO Service
Service From Date: 01/01/2015
Service To Date: 05/31/2015
Total Unit(s): 40.00

Figure 20

Professional Claim

Form ID: CLM-PAKSNE-07H24D320DF7L
Status: Pending Approval

Created By: Sophia Hayes, Other
Create Date: Wed, 20 May 2015 01:46:17 AM

Claim Information

| | |
|---|---|
| Payer | NFOCUS |
| Billing Provider | DEMO Billing Provider(EIN: 999999) |
| Pay-to Provider | DEMO Billing Provider(EIN: 999999) |
| Rendering Provider | DEMO Billing Provider(EIN: 999999) |
| Individual Name | Williams, Abigail (Medicaid Number: 3598227339) |
| Individual ID | 01878344 |
| * Signature On File | Yes |
| Individual ID | 01878344 |
| Signature On File | Yes |
| Place Of Service | 99-Other Unlisted Facility |
| Claim Frequency Type Code | 1-Original (Admit thru Discharge Claim) |

Figure 21

Share of Cost

Update History

Share of Cost

| | |
|---|---|
| Individual | Mary April Active |
| Month | May |
| Year | 2015 |
| Amount | 100 |
| Used Amount | 40.00 |
| Available Amount | 60 |

[Update]

Customer Obligation(s)

| Customer Obligation Date | Amount | Description | Action |
|---|---|---|---|
| 05/07/2015 | 40 | | [Edit] |

[Add Customer Obligation]

[Back]

| Billing | |
|---|---|
| Funding Source | New | List | Archive |
| Description/Code | New | List | Archive |
| Cost Center Type | New | List | Archive |
| Attendance Type | New | List | Archive |
| Leave Rule | New | List | Archive |
| Taxonomy Code | New | List | Archive |
| Billing Provider | New | Search | Archive |
| Custom PDF Invoice | New | List | Archive |

Click here to create new Billing Provider

Agency Wide and Administrative Roles

Administrative Roles
- ☐ Super Admin
- ☐ User
- ☐ Individual
- ☐ Provider Setup
- ☐ Activity Tracking
- ☐ Admin Report
- ☐ Supported Employment Tracking
- ☐ Caseload
- ☐ User Privilege
- ☐ Shared Contact
- ☐ Billing

Module Roles
- ☐ Labtest Create
- ☐ ISP Program Template Submit
- ☐ ISP Program Template Approve
- ☐ ISP Program Template View
- ☐ CDS Admin
- ☐ Global AFT Library
- ☐ Report Library
- ☐ Global Care Plan Template Library
- ☐ IB Data Admin
- ☑ IB Provider Data Admin

Figure 27

| | | Create IB Billing Document | | | | | |
|---|---|---|---|---|---|---|---|
| IB Billing Document | | | | | | | |
| Form ID | IBBD-DEMO1NE-8882ESU377JFE | | | | | | |
| Status | Approved | | | | | | |
| Claim Number: | CL-777891 | | | | | | |
| Service Provider Code: | 00658878 | | | | | | |
| Billing Month: | January, 2009 | | | | | | |
| Oversight Provider: | DEMO-NE (State of Nebraska - Division of Developmental Disabilities) | | | | | | |

| Service Authorization | | | | | | | |
|---|---|---|---|---|---|---|---|
| Sl. No. | Individual Name | Client ID Number | Authorization Number | Service Code | Service Name | Freq. | Rate | Service Consumed(Units) |
| 1 | Mary Active | 31029215 | 0101001 | S685 | CLES in Home | Hourly | 1.0 | ○ 01/02/2009 - 01/02/2009, 0.50 Unit(s)<br>● 01/01/2009 - 01/31/2009, 5.35 Unit(s) |

| Professional Claim | |
|---|---|
| Billing Data | New | Search | Summary | Detail Report | ISP Billing | Archive |
| Service Authorization | New | Search | Archive |
| Professional Claim | New | New (Using Template) | New Template | Send | [Search] | Template Search | Transaction Search | Archive |
| Report | Utilization | Unclaimed | Reconciliation | Denied Claim | Aging Report |
| Claim Submission | Send Claim |
| Remittance 835 | Upload | Search |

Figure 31

| Service Provider List | | | | | |
|---|---|---|---|---|---|
| Service Provider Code ▲ | Service Provider Name | Mapped Therap Provider | Form ID | Status ▲ | Action |
| 05911914 | WOOLDRIK, MEGAN E | DDDSC-NE (Service Coordination Account for DDD-NE) | GSDSP-DDDNE-C874QHVZ6A2XY | Approved | Show |
| 05024839 | LAMMERS, JUSTIN L | DDDSC-NE (Service Coordination Account for DDD-NE) | GSDSP-DDDNE-DA64YUYYR4M66 | Approved | Show |
| 05040009 | PATRICK, CHERYL | | GSDSP-DDDNE-A9W2YEPTYD | Approved | Show |
| 05081868 | CYZA, JOHN J. | DDDSC-NE (Service Coordination Account for DDD-NE) | GSDSP-DDDNE-D7A4CSLW87J7X | Approved | Show |
| 05116828 | BUTLER, SUMMER | DDDSC-NE (Service Coordination Account for DDD-NE) | GSDSP-DDDNE-DE44NNYYR4H74 | Approved | Show |
| 05132605 | BAKER, LYNETTE J | | GSDSP-DDDNE-B4A4NASY9H | Approved | Show |
| 05206091 | CARTER, DARRYL E. | | GSDSP-DDDNE-AC24CL5A7R | Approved | Show |

Figure 32

Service Provider

Update Details
Form ID: GSDSP-OODNE-A9W2YEES53
Status: Approved

Update History

Service Provider Information
Service Provider Code: 00507808
Service Provider Name: DEVRIES, JEANNE
Business Name:
Owner Organization ID:
Mapped Therap Provider: -- Please Select --    Create New Specialized Provider

Physical Address
Street 1: 402 N. 3RD AVE.
Street 2:
Street 3:
City: HASTINGS
Zip Code: 68901
County: Adams
State: NEBRASKA

Figure 33

```
File  Edit  Format  View  Help

PROVIDER NAME: BILLING PROVIDER OF NEBRASKA
PROVIDER ID: A123456789
CHECK NUMBER: 0001111111
CHECK AMOUNT: 350.00
CHECK ISSUE DATE: 06/01/2016

LAST NAME   FIRST NAME   INDV ID    CLAIM ID   DOS FROM     DOS TO       TCN                 SRV AUTH         STATUS   CHARGED AMT   PAID AMT
  SRV CODE                                                                                                              ORIG CLM ID
MOORE       WILLIAM      00222222   P4000001   05/01/2016   05/31/2016   01111122233344401   42034590113      PAID     100.00        100.00
  H2032 ADULT DAY HAB                                                                                                   P34500001
ACTIVE      MARY         00222223   P4000002   05/01/2016   05/31/2016   01111122233344402   42034590113      PAID     100.00        100.00
  H2032 ADULT DAY HAB
BROWN       HANNAH       00111114   P4000003   05/01/2016   05/31/2016   01111122233344403   42034590113      PAID     50.00         50.00
  H2032 ADULT DAY HAB
CRUZ        SALLY        00111115   P4000004   05/01/2016   05/31/2016   01111122233344404   42034590113      PAID     50.00         50.00
  H2032 ADULT DAY HAB
BROWN       MICHAEL      00111116   P4000005   05/01/2016   05/31/2016   01111122233344405   42034590113      PAID     50.00         50.00
  H2032 ADULT DAY HAB
```

Figure 34

| Roles | Authorized Activates |
|---|---|
| IBA Approve | Create/Discontinue/Discontinue and Create New IBA |
| Budget Create | Submit/Edit/Delete Budget in Draft/Rejected/Changes Rejected status, Add/Edit Service authorization, Delete Service Authorization in Budget with Draft/Rejected status |
| Budget Review | Add Review |
| Budget Approve | View Budgets in Draft/Rejected/Changes Rejected and Approved status, Approve/Reject Budgets in Pending Approval/Pending Changes Approval status |
| Budget Special Approve | View Budgets in Draft/Rejected/Changes Rejected and Approved status, Approve/Reject Budgets in Pending Approval/Pending Changes Approval status |

INTEGRATED HIPAA-COMPLIANT COMPUTER SECURITY SYSTEM FOR AUTHORIZING, DOCUMENTING, VERIFYING, BILLING AND ADJUDICATING LONG TERM SERVICES AND SUPPORTS, INCLUDING INDIVIDUAL BUDGETING

CROSS-REFERENCE TO RELATED APPLICATIONS

This application claims benefit of U.S. Provisional Application No. 62/186,193, filed Jun. 29, 2015, and is a continuation-in-part of U.S. patent application Ser. No. 13/675,440 filed Nov. 13, 2012, which is a continuation-in-part of U.S. Pat. No. 8,615,790 filed as U.S. patent application Ser. No. 13/600,388 on Aug. 31, 2012 and issued Dec. 24, 2013, which is a continuation-in-part of U.S. Pat. No. 8,613,054 filed as U.S. patent application Ser. No. 13/600,402 on Aug. 31, 2012 and issued Dec. 17, 2013, which is a division of U.S. Pat. No. 8,281,370 filed as U.S. patent application Ser. No. 11/604,557 on Nov. 27, 2006 and issued Oct. 2, 2012, the disclosures and teachings of each of which are incorporated herein by reference in their entirety.

BACKGROUND OF THE DISCLOSURE

Currently, individuals requiring care are assigned a budget based on an assessment of their needs. The individual and their support circle, including family, friends, case managers, guardians, service providers, and others, decides how to spend that budget on a range of services provided by a variety of companies and individuals. This is done in conjunction with developing a plan for how to achieve that person's goals and maintain his health and wellbeing. This is traditionally done using paper. The budget goes through an approval process, and if needed, an exception process, which is usually for a short term. Separate Service Authorizations are then generated, mailed to the appropriate providers and entered into the payment system. Once they have provided the system, providers will bill the payor for those services. Manual audits are conducted on samples to assure that services are provided and appropriately billed for by the right people/companies. This process is cumbersome and inefficient.

A system that integrates the many aspects of providing care services for an individual would be desirable.

BRIEF SUMMARY OF THE DISCLOSURE

Systems and methods for sharing billing information across at least two organizations in an integrated manner are described. A physical node may receive a request for authorization for a user in an organization to access an individual's information in another organization. The request may be logged. The physical node may determine whether the user is authorized to access the individual's information and, if it is, provide appropriate access. Also disclosed is an integrated web application and system which includes the core plan, budget, service authorizations, service documentation, claims, and communications of an individual under care and allows for calculated access and communication with external authorization and payment systems.

BRIEF DESCRIPTION OF THE FIGURES

FIG. 3 depicts a screen shot of an exemplary Individual Budgeting page.

FIG. 4 depicts a screen shot of an exemplary Individual List page.

FIG. 7 depicts a screen shot of an exemplary Service Authorization page.

FIG. 8 depicts a screen shot of an exemplary Budget Review page.

FIG. 9 depicts a screen shot of an exemplary IBA Exception page.

FIG. 11 depicts a screen shot of an exemplary Roles page with IB Data Admin module role selected.

FIG. 12 depicts a screen shot of an exemplary IB Data Admin Module page.

FIG. 14 depicts a screen shot of an exemplary Service Description/Code page.

FIG. 15 depicts a screen shot of an exemplary Billing Claim page.

FIG. 17 depicts a screen shot of an exemplary Attendance Report page.

FIG. 19 depicts a screen shot of an exemplary Service Consumption page.

FIG. 20 depicts a screen shot of an exemplary Professional Claim page.

FIG. 21 depicts a screen shot of an exemplary Costs share page.

FIG. 22 depicts a screen shot of an exemplary Submitted Consumed Unit List page.

FIG. 23 depicts a screen shot of an exemplary Billing page with the Billing Provider module selected.

FIG. 24 depicts a screen shot of an exemplary Billing Data page.

FIG. 25 depicts a screen shot of an exemplary Roles page with IB Provider Data Admin module selected.

FIG. 27 depicts another screen shot of an example of an IB Billing Document page.

FIG. 29 depicts a screen shot of an exemplary Billing page showing a System Rejected Worklist screen.

FIG. 30 depicts a screen shot of an exemplary Professional Claim page.

FIG. 31 depicts a screen shot of an exemplary non-specialized Service Provider List.

FIG. 32 depicts a screen shot of an exemplary non-specialized Service Provider page.

FIG. 33 depicts a screen shot of an exemplary Remittance Report in Text format.

FIG. 34 depicts the functionality of IBA Approve, Budget Create, Budget Review, Budget Approve, and Budget Special Approve roles.

DETAILED DESCRIPTION OF THE DISCLOSURE

The invention relates to an integrated web application which includes the core plan, budget, service authorizations, service documentation, claims, and communications of an individual under care and allows for calculated access and communication with external authorization and payment systems.

Figure 1:
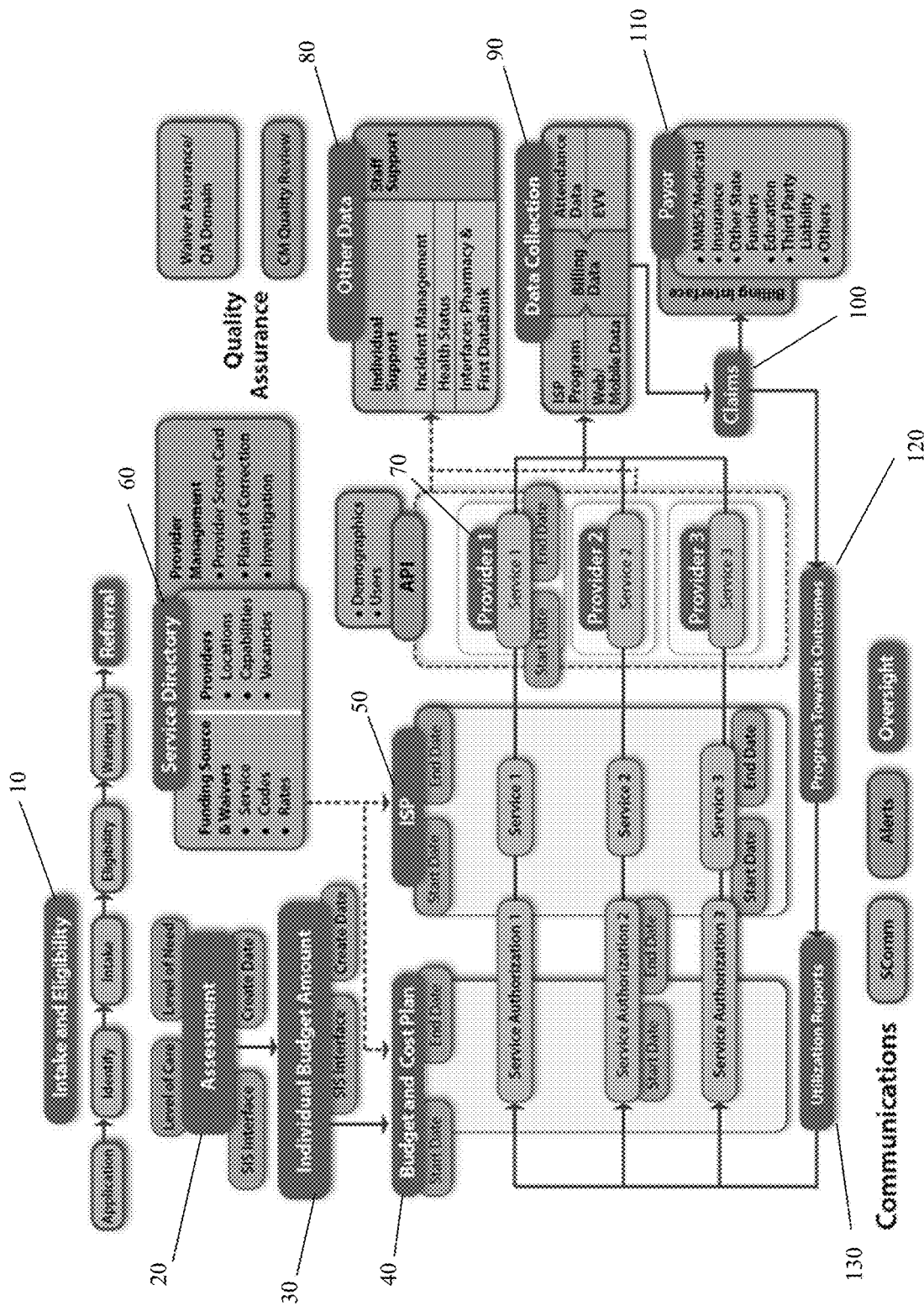
FIG. 1 is an overview of an exemplary integrated billing and services process according to the present invention.
Figure 2:
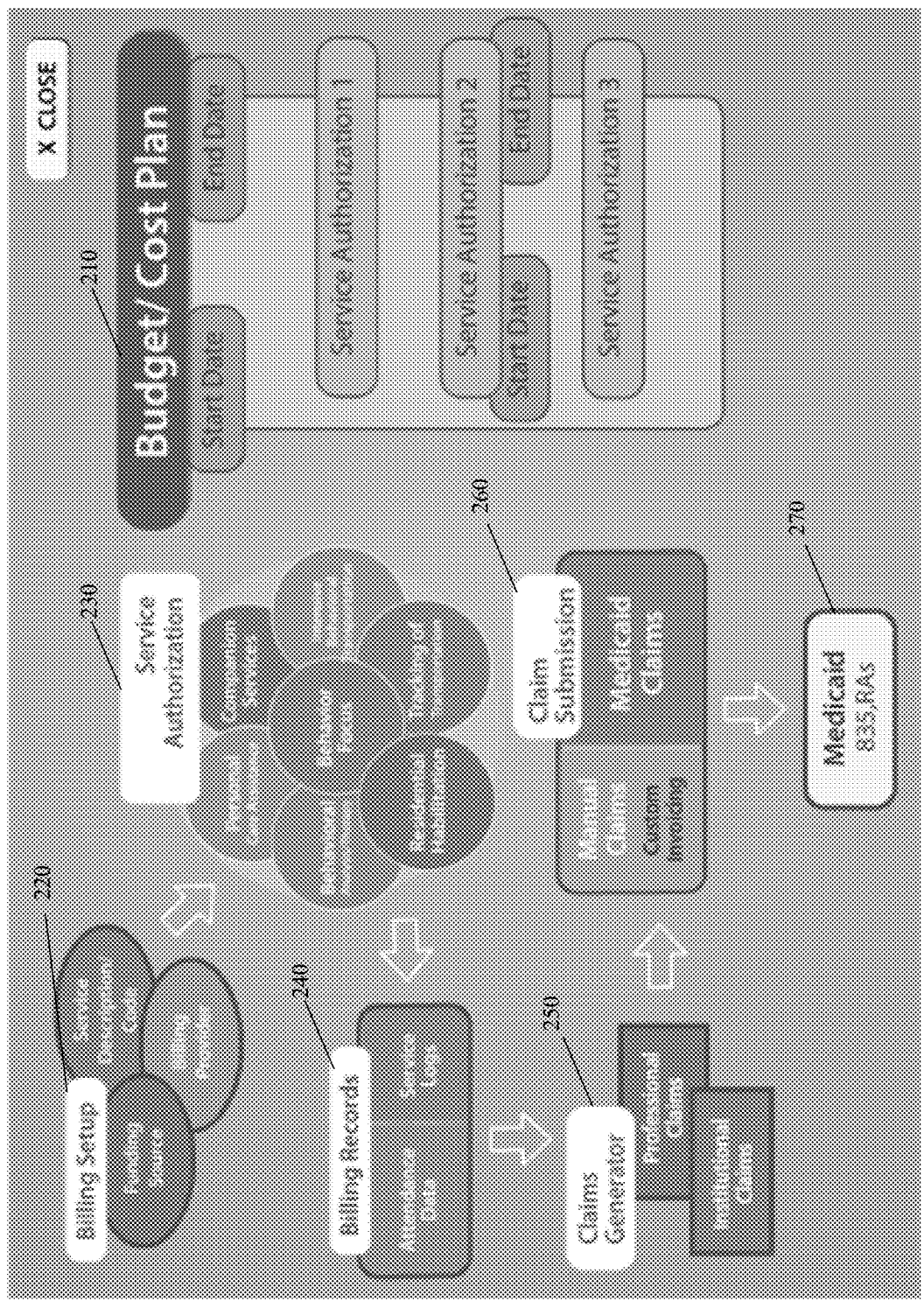
FIG. 2 depicts an overview of the unified budget and cost plan of the invented system.

In the invented system, the core plan, budget, service authorizations, service documentation, claims, and communication are housed within a system, such as a single web application, which allows for calculated access and communication with external authorization and payment system (FIGS. 1-2). As outlined in FIG. 1, the process begins with intake and eligibility steps 10 which include assessment of the individual's needs 20 and calculation of the Individual Budget Amount 30 (IBA) for the individual's treatment. Based on the IBA, the individual's team (which can be represented by the case manager/service coordinator) develops a budget and cost plan 40 and an Individual Service Plan 50 (ISP) within the system.

The total Individual Budget Amount and Individual Service Plan is calculated based on an assessment of the individual's needs. These plans are available to team members with the application based on roles and caseloads, as described in U.S. Pat. No. 8,281,370. When the budget is approved by a supervisor, each service authorization within it is then sent to the provider agency 60 that will be providing the service, selected from a service directory 70. Each agency can not only see its own authorizations, but can see the whole plan.

If the agency accepts the authorization, the system automatically sets up the appropriate attendance log where direct support staff can enter data 80 in real time as to when the individual was present and receiving the authorized service. Data collection 90 includes attendance and billing data. An agency supervisor can review and approve the attendance data. Access to this functionality is based on roles and caseloads. Once approved, the agency's finance staff can then generate claims 100 with a couple of clicks, as opposed to the long and complicated process involving paper and multiple systems. The claims are then routed to the appropriate service coordinator for approval. If approved they are sent to a payor 110 such as the state MMIS (Medicaid and Medicare information system) for payment. If rejected, they are returned to the provider. The state, individual, case manager and circle of support can now all have real time access to utilization data to monitor services and progress toward outcomes 120, generate utilization reports 130 as needed, and forecast future needs (based on caseloads and super roles).

As outlined in FIG. 2, the unified budget and cost plan 210 begins with a billing setup 220, which includes identification of funding source, service codes, and billing providers. Service authorization 230 is the next step, which oversees aspects that can include personal care assistance, companion services, behavior focus, behavioral analysis/therapy, behavioral transportation and tracking, and residential habilitation. Billing records 240 are generated including attendance data and service logs. The claims generator 250 generates professional and institutional claims. Claim submission 260 can be manual and/or Medicaid 270 claims.

Individual Budget Amount (IBA).

Figure 4:
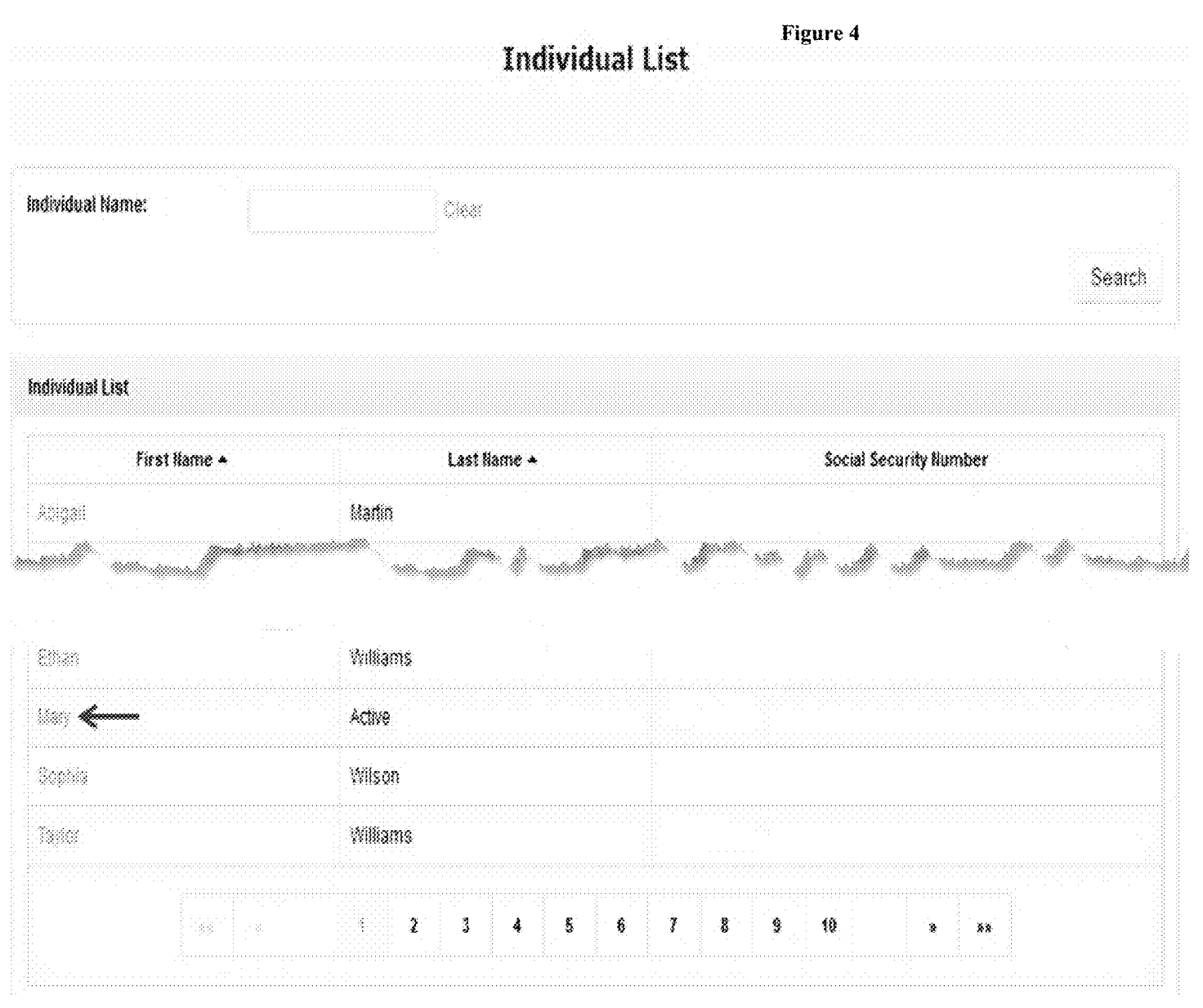

Users are required to create an Individual Budget Amount (IBA) to start the Individual Budgeting procedure. Users assigned with the IBA Approve role will be able to create a new IBA. Users of Oversight Account can click on the Create link below IBA option under the Individual Budgeting section from User's Unified Dashboard (FIG. 3), which will take users to the Individual List page (FIG. 4) where users can select the Individual for creating the IBA. After clicking on the 'Create New' button on the IBA page, users assigned with the IBA Exception Amount role will be able to specify the amount for IBA and the information will be saved after clicking on the 'Save' button. The above procedure will create a new IBA for the Individual. Users may also discontinue this IBA by clicking on the 'Discontinue' button or create a new IBA after discontinuing the existing IBA using the 'Discontinue and Create New' button. Users may view IBA by clicking on the Search link below the IBA option under the Individual Budgeting section from the Unified Dashboard. This action will open the IB-IBA Search page. Users then enter the name of the Individual and by clicking on the Search button, the IBA information of the individual will be shown.

IB Individual Budget.

Figure 5:
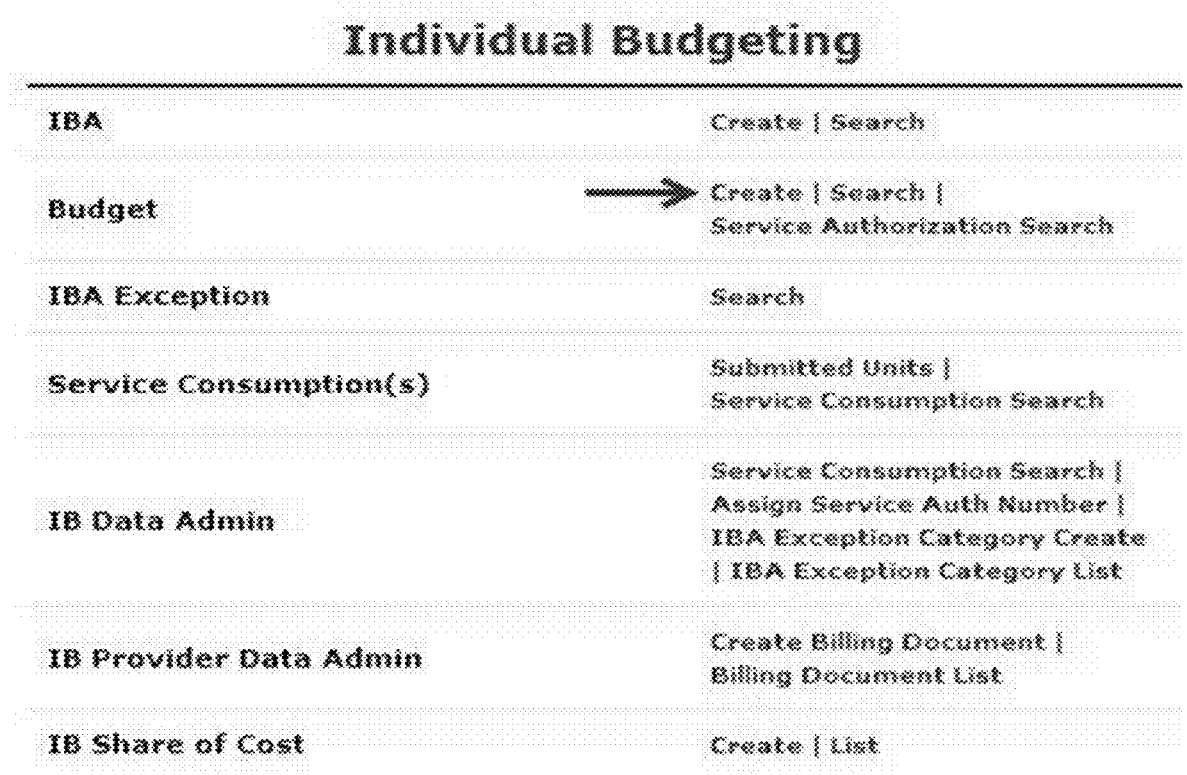
FIG. 5 depicts a screen shot of a further exemplary Individual Budgeting page.

Once an IBA has been created for an Individual, users with the Budget Create role will be able to create a Budget for an Individual (FIG. 5). Users can click on the Create link for Budget under the Individual Budgeting section from the Individual tab on the Dashboard. For the Oversight Account, users can click on the Create link under the Budget section of the Unified Dashboard. This action will take users to the Individual List page and users can select the Individual from the list. The Create New Budget page will then open where users can enter the Applicable IBA, Form Date and To Date of the Budget for the Individual. After users clicking on the 'Save' button, a message of Successfully Saved Budget with Form ID will be shown. Users can click on the 'Show Budget' link and they will be taken to the Budget page of the Individual.

Figure 6:
FIG. 6 depicts a screen shot of an exemplary Budget page.

In the Budget page, users may add Service Authorization(s) for the Individual within the Budget period (FIG. 6). Users can add service by clicking on the 'Add Service' button under the Service Authorization section in the Budget page. This will open the Service Authorization page. Users can then select the Service, From Date, To Date and Total Units to be provided. Users can specify the Authorization Number and Comments if any and then click on the 'Next' button. The Service Authorization Date Range must be within the Budget period. Otherwise users will receive a message of Data Range must be within Budget Duration. This will let users enter further information. Users can select the Service Provider from the drop-down which provides users with the name of the Providers managing the Service specified in the Service Directory. Users can select the Service Rate and if the rate is not fixed, users can mention it in the Rate Amount/Unit field. Users will have a 'Quick Calculator' with a small calculator icon to calculate Rate Amount/Unit.

After clicking on the 'Next' button, users will arrive at the Service Authorization page (FIG. 7). Monthly Allocation units must not exceed Total Unit of Service Authorization. Users may allocate Service units using options of Allocate Total Unit(s) or Allocate Month Day(s). If users use Allocate Total Unit(s) link, this will allocate the total units uniformly across the months. If users use the Allocate Month Day(s) link, this will allocate the total units depending on the number of days in the month. Necessary information will be saved after clicking 'Save' button. A message of Successfully Added Service to the Budget with Authorization Form ID will appear once the Service is added to the Budget for the Individual. Users click on the Show Budget link and this will take users to the Budget page. After adding the Service Authorization to the Budget page, users may click on the Edit link or Delete link to edit the information added for the particular Service Authorization or deleting the Service Authorization. Users are also able to view the status of Service Authorization on the Budget page and can identify whether the Service Authorization has been sent to a Provider or not.

Users can submit a budget by scrolling down to the bottom of the Budget page and click on the 'Submit' button. This will change the status of the Budget from 'Draft' to 'Pending Approval'. Users may also delete the budget created using the 'Delete' button. Users with the Budget Review role will be able to add reviews to Budgets in 'Pending Approval' or 'Rejected' status. To add reviews, Users can click on the count beside the Pending Approval or Rejected links. For Oversight account, users can click on the Pending Approval link under the Budget section of the Unified Dashboard. Then, users can select the budget from the Pending Approval Budget(s) page, and scroll down to the bottom of the Budget page and click on the 'Add Review' button. This will open a Review page (FIG. 8) where users can enter their review and then can click on the 'Save' button. A message of Successfully Added Review for Budget with From ID will appear after clicking on the Save Button.

The budget and plan are available to team members through the system based on roles and caseloads as described in U.S. Pat. No. 8,281,370.

In the next step, the budget is reviewed by a supervisor. If the supervisor approves the budget and plan, each service authorization within the plan is sent to a provider agency that can provide the service. Users with the Budget Approve role will be able to approve Budgets in Pending Approval status. To approve a Budget, users can click on the count appearing beside the Pending Approval link. For Oversight account, users will click on the Pending Approval link under the Budget section of the Unified Dashboard. Then, users select the budget from the Pending Approval Budget(s), scroll down to the bottom of the Budget page and click on the 'Approve' button. This will change the status of the Budget from 'Pending Approval' to 'Approved'. Users will be taken to Budget page and click on the Approve button. After clicking on the Approve button, a success message of Shareable Services Authorization(s) has been sent to Provider. Budget Approve Successful with Form ID will show. Users may also reject the budget by clicking on the 'Reject' button. This will change the status of the Budget from 'Pending Approval' to 'Rejected'.

Budgets having IBA Exceptions or services with a rate type 'Range' whose rate has exceeded the maximum amount specified in the Service Directory will need a special approval. Users with Budget Special Approve role can approve these Budgets. A count will appear for these budgets against the 'Pending Approval' link under the Budget section. Budgets that are rejected can be resubmitted for approval. In order to resubmit a budget, users can have the Budget Create role. To resubmit a budget which has been rejected, users click on the count appearing beside the Rejected link. For Oversight account, users click on the Rejected link under the Budget area of the Unified Dashboard. This will take users to the Rejected Budget(s). Users can select the budget from the list, and make necessary changes to the service authorization(s). Then users can click on the 'Submit' button. This will change the status of the Budget from 'Rejected' to 'Pending Approval'. A budget in 'Draft' or 'Rejected' status can be deleted by clicking on the 'Delete' button. This will change the status of the Budget from 'Draft' or 'Rejected' status to 'Deleted' status.

To view the list of Budgets in different status, Users click on the Search link for Budget under the Individual Budgeting section from the Individual tab on their Dashboard. For Oversight account, users click on the Search link under the Budget area of the Unified Dashboard. This will open the IB-Budget Search page where users can enter the appropriate parameters to get the Budget users are looking for. Users will be able to edit IBA, Applicable IBA and Duration of an approved Budget. This will change the status of an 'Approved' Budget to 'Pending Change Approval'. Users with the Budget Approve role can approve the Budget with changed IBA, Applicable IBA and Duration. However, users will be unable to change the Budget duration if Service Consumption units are already recorded for the duration and will receive a message of Service Already Added for Date Range.

Providers.

Figure 35:
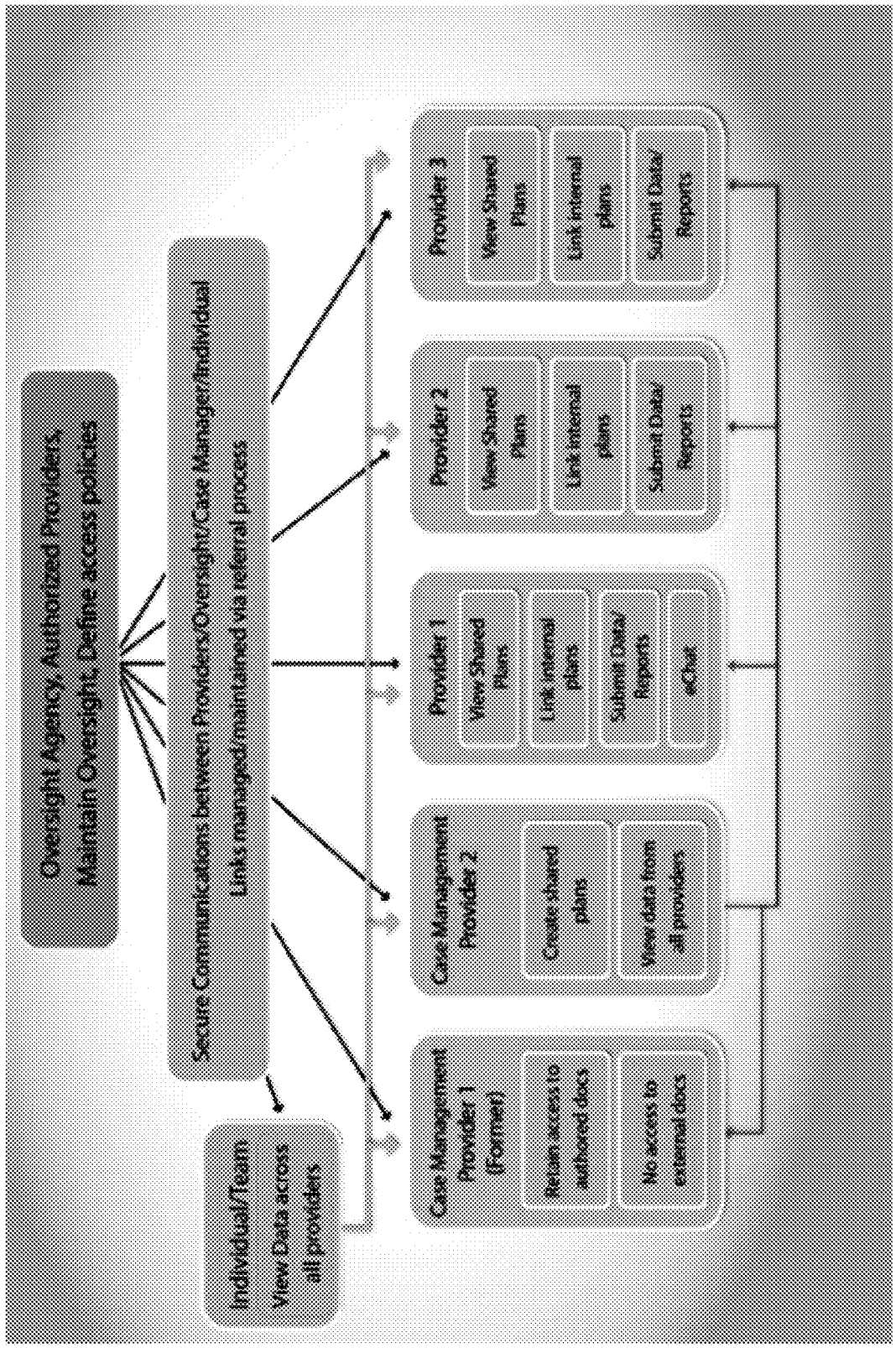
FIG. 35 is a flowchart showing organizational and communications hierarchies.

Providers can be institutional, such as a hospital, healthcare organization, educational or penal facility, or an individual/independent provider. FIG. 35 outlines the hierarchy of provider and service roles. Linked providers are providers that are linked to an agency, such as a state or federal agency. The agency has an oversight account to access the information in the system. Independent Providers, also known as Non-Specialized Providers, are people who have signed up to become Agency Providers so that they can provide services, generally to individuals receiving services who are directing those services for themselves. These independent providers are often friends or neighbors of the service recipients. Independent providers may provide non-specialized services, such as housecleaning or other general assistance. For scale, Nebraska has about 40 Provider agencies and over 1000 Independent Providers. The disclosed system and methods provides an automated process which simplifies account creation for the agency overseeing the Provider (the "Oversight Agency"), and account use for Independent Providers. This replaces a cumbersome process of sending and receiving paper forms followed by data entry. When a new Independent Provider registers with Medicaid, with one click, the state can create a Provider Account with all the correct attributes, set up, and linked and ready to receive referrals and service authorizations as described elsewhere. The Provider Account has only one user which is automatically created with the right permissions to be able to receive Service Authorizations, collect data, submit claims, and receive remittance advice for one or more individuals that they are providing services to. One of the advantages of the disclosed system is that both the specialized and non-specialized/unmapped providers can be integrated within the system and billing/payment can be processed electronically for any type of provider. This process allows for quicker, more accurate collection of data and faster payment of claims while meeting Medicaid requirements for audit.

IB Send Service Authorization to a Linked Provider—for Service Coordinators.

Within the Individual Budgeting module, Service Coordinators can send Service Authorizations to Linked Providers. Users will require appropriate roles, such as one or more of an IBA Approve role, Budget Create role, Budget Review role, Budget Approve role and/or Budget Special Approve role (FIG. 34) in order to be able to create an Individual Budget Amount (IBA) or Individual Budget and to send Service Authorization to a Provider. Users can click on the Create link under IBA in the Individual Budgeting section on Unified Dashboard of the Oversight Agency account (FIG. 3). This will take users to the Individual List page where users can select the Individual for creating the IBA. Users may filter the list by typing the name of an Individual in the Individual Name text-box at the top. By clicking on the Individual's name from the Individual List, Users will be taken to the IBA page. Users may enter the first few letters of the Individual Name and an auto complete list will appear showing possible matches. Users can select the particular Individual Name from the list. On the IBA page, Users then click on the 'Create New' button to create a budget for the Individual. Users can enter the amount for the Individual budget in the Amount field and then click on the 'Save' button to save the information. This will create a new IBA for the Individual. Users may discontinue this IBA by clicking on the 'Discontinue' button or create a new IBA after discontinuing the existing IBA using the 'Discontinue and Create New' button. Only one active IBA can exist for an Individual in the system.

To create an individual budget, Users can click on the Create link under Budget area in the Individual Budgeting section on their Unified Dashboard of the Oversight Agency account. This will take users to the Individual List page. Users can select the Individual from the list. Users may filter the list by typing the name of the Individual in the Individual Name text-box at the top of the page. Clicking on the Individual's name will take users to the Create New Budget page. Users can then enter the Applicable IBA, Form Date and To Date of the Budget for the Individual under the Create New Budget section. After clicking on the 'Save' button, the draft of the Individual Budget will be saved and users will be directed to the Budget page of the Individual. Here users may add Service Authorization(s) for the Individual within the Budget period.

To add service authorization, on the Budget page, users can click on the 'Add Service' button to add a Service Authorization to the budget users had just created. This will open the Service Authorization page. Users can select the Service, From Date, To Date and Total Units to be provided, and specify the Authorization Number and Comments if any. Clicking on the 'Next' button will let user enter further information. The Service Authorization Date Range must be within the Budget period. Users can select the Service Provider from the drop-down which provides users with the name of the Providers managing the Service specified in the Service Directory. Users can select the Service Rate and specify the rate type and then click on the 'Next' button to proceed further. The Monthly Allocation section will then appear on the Service Authorization page where users can allocate the service units for each within the budget period. Users may allocate the total unit uniformly by clicking on the Allocate Total Unit(s) link or Allocate Month Day(s) link. Monthly Allocation units must not exceed Total Unit of Service Authorization. Once users are done, users can click on the 'Save' button to save the necessary information. This will take users back to the Budget page. After adding the Service Authorization to the Budget page, users may click on the Edit link or Delete link to edit the information added for the particular Service Authorization or deleting the Service Authorization.

Users may add another Service Authorization to this budget by clicking on the 'Add Service' button. For Submitting Budget, users click on the Draft link under Budget area in the Individual Budgeting section on their Unified Dashboard of the Oversight Agency account. This will take users to the Budget List page. By clicking on the particular Form ID from the list that users would like to open, users will be taken to the Budget page. By clicking on the 'Submit' button located at the bottom right corner of the Budget page, the status of the Budget will change from 'Draft' to 'Pending Approval'. For approving the budget, users click on the Pending Approval link under Budget area in the Individual Budgeting section on Unified Dashboard of the Oversight Agency account. This will take users to the Budget List page. By clicking on the particular Form ID of the Budget that users would like to open, users will be taken to the Budget page. On the Budget page, users can scroll down to the bottom of the page and click on the 'Approve' button to approve the Budget form. A message of Budget Approve Successful for Individual will appear on the Budget page confirming the successful approval of the Budget.

Users can also send service authorization to a provider by clicking on the List link under Budget area in the Individual Budgeting section on Unified Dashboard of the Oversight Agency account. This will open the Budget List page. Users can search for a particular Budget by specifying search criteria such as: Individual Name, Form ID, Status etc. and clicking on the 'Search' button. Users will be taken to the Budget page by clicking on the Form ID of the Budget that will be listed based on users search criteria. On the Budget page, users can click on the Send To Provider link available under the Service Authorization section in order to send the Budget to a Provider. This will take users to the Service Authorization Submission page. Users then click on the 'Send' button to send this Service Authorization to the mapped Provider for the mapped Individual. A message of Successfully Submitted Service Authorization will appear on the Budget page of the Individual once the Service Authorization has been submitted to the Linked Provider Agency. The status of the Service Authorization will also be displayed on the Budget page indicating the date and time when the Service Authorization has been sent to the Provider agency. If the Service Authorization is updated after it has been sent to the Provider, then a message appears to describe the status of the Service Authorization.

IBA Exception.

Users with IBA Exception Create and IBA Exception Amount roles will be able to add IBA Exceptions to Individual's Budget. Users can click on the Search link for Budget under the Individual Budgeting section from the Individual tab on their Dashboard. From users Unified Dashboard (For Oversight Agency users), users click on the Search link for the Budget section. This will open the IB-Budget Search page. Enter users search parameter as appropriate. From the search result, users can click on the Form ID of the budget. User then will be taken to the Budget page. Clicking on the 'Add IBA Exception' button under the IBA Exception section will take users to the IBA Exception page where users can add IBA Exception Description, Exception Amount, Date range and Category. By clicking on the 'Save' button to save the IBA Exception, the status of IBA will change to 'Draft' and users will receive the message of IBA Exception Save successful for individual.

Figure 10:
FIG. 10 depicts a screen shot of an exemplary IBA Exception Review page.

To submit the IBA Exception for approval, users can click on the Draft link for the IBA Exception option from Unified Dashboard/Dashboard. From the Draft IBA Exceptions page, users can select the particular IBA Exception. By clicking on the 'Submit' button to submit the IBA Exception, the status of IBA will change from 'Draft' to 'Pending Approval'. Then user will receive the message of IBA Exception Submit successful for individual. Users with IBA Exception Review role will be able to add reviews to an IBA Exception. To add a review, users can click on the List link under the Individual Budgeting section of the Unified Dashboard or beside the IBA Exception from the Individual tab on user's Dashboard. Users will be taken to IB-IBA Exception Search page and can enter the search parameter as appropriate. Users can select the particular IBA Exception from the search result. After opening the particular IBA Exception, users can click on the 'Add Review' button to add reviews (FIG. 9). This will open the IBA Exception Review page (FIG. 10) where users can enter reviews. Users can click on the 'Save' button to save review. Users cannot add reviews to an already approved IBA Exception. Users will receive the success message of IBA Exception Review Added Successfully.

Users with IBA Exception Approve role will be able to approve an IBA Exception. Users will be able to view IBA Exceptions that are yet to be approved from the Pending Approval link for IBA Exception under the Individual Budgeting section of Unified Dashboard or by clicking on the Pending Approval link beside the IBA Exception option from the Individual tab of their Dashboard. Users will then be taken to the Pending Approval IBA Exception(s) page, and can select the particular exception. Users can click on the 'Approve' button on the IBA Exception page to approve the IBA Exception. Users may also reject by clicking on the 'Reject' button. Users will receive the success message of IBA Exception Approve Successful for Individual when users approve, and receive the success message of IBA Exception Reject Successful for Individual if users reject. Rejected IBA Exceptions can again be submitted for approval. Once submitted, it will change the status of the IBA Exception from 'Rejected' to 'Pending Approval'.

IB IBA Exception Category.

Provider Administrators or Users with IB Data Admin Module role are able to create and view IBA Exception category. Provider Administrators or Users with 'User' Administrative role can enable the IB Data Admin Module role for the user account (FIG. 11).

To create an IBA Exception Category, users can click on the IBA Exception Category Create link for IB Data Admin under the Individual Budgeting section from the Individual tab on the users Dashboard. This will take users to the IBA Exception Category Create page where users can scroll to the Category Name and click on the 'Save' button. A success message of Successfully Saved IBA Exception Category will appear on saving the IBA Exception Category. In order to access IBA Exception Category List, users can click on the IBA Exception Category List link for IB Data Admin under the Individual Budgeting section from the Individual tab on their Dashboard. This will take users to the IBA Exception Category List page where users will find the IBA Exception categories created. Users can click on the Show link to select the IBA Exception category that want to edit or delete and this will open the IBA Exception Category page where users may edit or delete the IBA Exception Category.

Selecting Waiver on a Budget—for Service Coordinator Supervisors.

Service Coordination Supervisors can select a waiver for Waiver Program Enrollment on an individual's budget. The Budget needs to be in 'Pending Approval' status. To do so, users can click on the Pending Approval link under the Individual Budgeting section on Unified Dashboard, users will then be taken to the Pending Approval Budget(s) page. Users will select a Budget from the list of budgets with 'Pending Approval' status. This will open the budget form. Users can select the appropriate Waiver from under the Waiver Program Enrollment section. After users selected the waiver, users can scroll down to the bottom of the page and click on the 'Approve' button to approve the budget.

Acknowledge a Service Authorization—for Linked Provider Users.

When a Service Coordinator sends a Service Authorization to a Linked Provider, the users at the Linked Provider can acknowledge that Service Authorization. They will receive a count under the Individual Budgeting section on their To Do tab of the Dashboard for the Service Authorizations that they can acknowledge. In order to be able to acknowledge Service Authorizations, users can have appropriate access privileges on the Individual and will also require the IB Provider Service Authorization. The Acknowledge role is assigned to the respective user accounts. If the users find any discrepancies in the Service Authorization, then they can contact the Service Coordinator regarding this.

In order to Acknowledge a Service Authorization, Users can click on the number beside Acknowledge under the Service Authorization section in the To Do tab (FIG. 12). This will open the Service Authorization list page. When users click on a Form ID of the Service Authorization that users would like to open, it will take users to the Service Authorization page. On the 'Billing Service Authorization' section of the page, users can select the Program (Site) where the service will be provided to the individual using the dropdown menu. After users have done so, users can click on the 'Acknowledge' button. Users will receive the success message of Successfully Acknowledged Service Authorization and the status of the Service Authorization will be changed from 'Pending' to 'Acknowledged'.

Acknowledging the Service Authorization will create a Billing Service Authorization which will be used to generate Billing Claims for the services provided. The system will automatically record Service Consumptions using the submitted claims. Users can access the Billing Service Authorization form from the Service Authorization by clicking on the link beside 'Form ID:' under the 'Billing Service Authorization' section. Users can also Contact the Service Coordinator via SComm if they find any discrepancies in the Service Authorization; users should contact the Service Coordinator who sent the Service Authorization to their agency. Users may contact the Service Coordinator via the Secure Communication (SComm) module. In order to be able to send SComm messages to user's Service Coordinator, the user's account can be assigned with the Multi Provider SComm role. To send a Scomm message to the Service Coordinator, Users can click on the Compose link under the Secure Communications area on their Dashboard and choose 'General' option as the type of SComm message. In the 'Select Recipient' area, users can select the 'Provider' tab and click on the name of the country, state, or city, such as, for example, Nebraska. Users then select on the check beside the name of the Service Coordinator users want send the SComm to and click on the 'Add' button. This will add the Service Coordinator under the 'Recipient(s)' area. In the 'Message & Options' area, users will select Notification Level, enter Subject and then type in message about the discrepancies users have found in the Service Authorization. Once users are done, they can click on the 'Send Message' button at the bottom of the page.

Each agency can see its own authorization as well as the whole plan. The agency reviews the authorization and can choose to accept or reject the authorization through the system. If the agency refuses the authorization, the system alerts the supervisor and/or other team members to the refusal.

If the agency accepts the authorization, an attendance log is automatically generated by the system. This attendance log allows direct support staff to enter data in real time as to when the individual was present and received the authorized service.

Setting Up Attendance Type for Linked Providers.

Figure 13:
FIG. 13 depicts a screen shot of an exemplary Billing page.

To enter Attendance to submit consumed units to the Oversight, users can create a new Attendance Type and configure a Service Description to use this Attendance Type. To create a new Attendance Type, users can click on the 'New Attendance Type' link on the 'Billing' Section under the Admin tab of the Dashboard (FIG. 13). Users can enable the User for IB option by clicking on the checkbox. Then provide a Type Name. If users are creating the Attendance type for a Service with Daily units of measure, users then select the 'No' option for the Use Time In/Out field. If users are creating the Attendance type for a Service with Hourly units of measure, they select the 'Yes' option for the Use Time In/Out field. On the Options section of the form, users can enter one or more Option Name(s) and their corresponding Option Code and/or Billing Units. Under the Billable column, users can indicate which options will be marked as 'Billable'. If Time In/Out is required, then the Billing Units column will be disabled and Billable Units will be calculated from Time In/Out. When users have completed entering all the information, users click on the 'Save' button.

When creating a Service Description, users can specify 'Attendance' as the Method of Data Collection. Users also can select an Attendance Type from the Attendance Type dropdown menu (FIG. 14). On the Service Description/Code form, the Used for IB option needs to be set to 'Yes' to be able to select Method of Data Collection.

Enter and Approve Attendance Data:

Users with the Attendance Data Submit role will be able to view the Attendance section on the Billing tab on their Dashboard. To enter/record Attendance Data, users will need an approved Service Authorization. In order to Enter Attendance Data, Users can click on the New link beside the Attendance section under the Attendance area on the Billing tab on their Dashboard. The Search Service for New Attendance page will open. Then users can select the Service Date as appropriate and then select the Attendance Type Name field. When users select the Attendance Type Name, the Service Description (Code) will list options depending on the selected Attendance type. When the Service Description (Code) is selected, the Program (Site) field will populate depending on the programs linked to the particular Service Description (Code). Once users have selected all the parameters (as appropriate), click on the 'Search' button to view the Attendance Grid. The Individual list will contain all the individuals having Service Authorizations under the selected Program with the specific Service Description Code. Users can enter Attendance information for multiple individuals at the same time. New Attendance Data can only be entered from the New section under the 'Input' tab of the Attendance Grid (FIG. 17).

Figure 18:
FIG. 18 depicts a screen shot of an exemplary portion of an Attendance Report page.

On the Attendance page, Users can select the Attendance Option (Present, Absent etc), Time In/Time Out and select the Individuals for whom users will enter data. For midnight time calculation, users can enter 12:00 am/Midnight as Time Out: from the Attendance Grid on the Attendance Data Update page (FIG. 18). Once users have selected all the fields as appropriate, users click on the 'Submit' button to submit the entries. Once the attendance entries have been submitted, these entries will be in In Prep status. In many cases, time in/time out is not required by users, for such scenarios users may leave the Time In/Time Out fields blank. This will give users a prompt to make sure that users are doing it intentionally. For example, for an Attendance Option like 'Absent', it is not logical to put Time information, so users can skip by not entering Time In/Out. In order to record attendance data with only the Time In field, users can specify just the Time In and submit an Attendance Data. Users will receive a message once they try to submit an Attendance record with the 'Time In' specified and not the 'Time Out'. Users will click on 'Yes' to submit the Attendance record with just the 'Time In'. Attendance Data having just the Time In and no Time Out will remain in Incomplete state and cannot be approved unless Time Out is specified later on. From the 'Incomplete' section on the Attendance page, users enter the Time Out and select one or more Individuals by clicking on the check-boxes. Users click on the 'Submit Incomplete' button to submit the incomplete Attendance record.

For adding a service provider, if a 'Service Provider' is added from the Service Provider drop-down menu while recording Attendance data, users will view a 1 in the red notification box appearing next to the 'Attendance option' (e.g. 'P', 'A' etc) on the Attendance grid even when there is no Time In/Out information provided. The '1' in the red notification box signifies that there is no Time In/Out information recorded and that Service Provider information has been added. Moving the cursor to the red '1' will display a message stating that the Time In/Out is not provided. Users will be able to view the details of the Attendance type (specified for the particular Service Authorization) from the Attendance Type Details link located at the top-left corner of the Attendance page. For approving attendance data, users with Attendance Data Approve role will be able to approve Attendance Data in In Prep state from the Approve tab of the Attendance Grid. On the Approve tab, users will select the appropriate attendance entries that can be approved and click on the 'Approve' button.

Once an Attendance Data is approved, a success message of Successfully Approved will appear at the top of the Attendance page and the data is shown in Green color. Approved Attendance Data can be updated by users having Attendance Data Update Role. For generating billing data, users with both Attendance Data Approve and Billing Data Submit roles will be able to generate billing data from the 'Generate Billing Data' tab in the main Attendance Grid. Users can only generate Billing Data from Approved Attendance Data. Once Billing Data is generated from Attendance Data, it will be shown in Orange color. On the Generate Billing Data tab, users will select the Individuals for whom users require to generate billing data. A success message of Successfully Submitted For Billing will appear on generating the Billing Data. Users can click on the 'Ok' button to get back to the Attendance page. The Attendance data box will be marked orange to indicate that it has been submitted for Billing. For changing attendance data status from "Submitted for Billing" to "In-Prep", Attendance data that has been Submitted for Billing can be changed back to In Prep if no billing data was generated for that particular day. At the bottom of the Attendance Data Update page, users can click on the Reset Status to In Prep button to change the status of the Attendance Data that was Submitted for Billing to In Prep. Once the status of an attendance data has been changed from 'Submitted for Billing' to 'In Prep', the Attendance Grid will display that Attendance Data in In Prep status. For Attendance data that has been updated to In Prep status (from 'Submitted to Billing' status), on the respective Attendance Data Update page users will view the message "Attendance Status was changed from Submitted for Billing to In Prep".

An agency supervisor can review and approve the attendance data. Access to the attendance data and supervisory review can be limited based on roles and caseloads of other members providing services as described in U.S. Pat. No. 8,281,370.

If the agency supervisor approves the attendance data, the system forwards information to the agency's finance staff for billing. The finance staff can then easily generate claims through the automated process as described in U.S. Pat. No. 8,281,370.

Create New Funding Source—for Linked Providers.

From the Admin tab on the users' Dashboard, users click on the new link for Funding Source under the Billing section. In the Funding Source page, users can enter the Name of the Funding Source, complete the Contact Information section. Users must select NFOCUS from the Payer drop-down field for Electronic Billing.

IB Create & View Funding Component.

Oversight Agency users with IB Data Admin module role are able to create Funding Component. They can view funding components from the Funding Component List. To create a Funding Component, users can click on the Create Funding Component link under the IBA Worksheet section of Individual Budgeting module. Users will be taken to the Funding Component page. Users will enter the Funding Component's name in the Funding Component Name: field and click on the 'Save' button. Users will be taken to the Funding Component List page. On this page, users will see a statement confirming the successful saving of the Funding Component. Users may click on the Show link associated with the Funding Component to view it. Users will be taken to the Funding Component page. In addition, users can create another Funding Component by clicking on the 'Creating Funding Component' button located at the bottom of the Funding Component List page. Users can edit the Funding Component. After making any necessary edits, users simply click on the 'Save' button located below to save the changes. Users may also discontinue the Funding Component by clicking on the 'Discontinue' button located at the bottom right corner of the page. To view a Funding Component, users click on the Funding Component List link under the IBA Worksheet section of Individual Budgeting module. Users will be taken to the Funding Component List page. Users then can enter the name of the Funding Component in the Funding Component Name field and press the 'Enter' key on their keyboard. This will filter out the Funding Component that users wish to view. Users can also discontinue its status or edit it by clicking on the Show link associated with it.

IB Create & View Funding Component Status.

To create a Funding Component Status, users click on the Create Funding Component Status link under the IBA Worksheet section of Individual Budgeting module. Users will be taken to the Funding Component Status page. Users can enter the name of the Funding Component Status in the Funding Component Status: field and click on the 'Save' button located at the bottom right corner of the page. Users can also make it Reportable by clicking on the checkbox beside Reportable option. Users will be taken to the Funding Component Status List page. On the Funding Component Status List page users will see the confirmation statement of Successfully Saved Funding Component Status 'Pending' indicating that the Funding Component Status has been stored in the system. Users can also create another Funding Component Status by clicking on the 'Create Funding Component Status' button located at the bottom right corner of the page. To view a Funding Component Status, Users can click on the Funding Component Status link under the IBA Worksheet section of Individual Budgeting module. Users will be taken to the Funding Component Status List page. Users can enter the Funding Component Status name in the Funding Component Status field and press the Enter key on user's keyboard. This will filter out the Funding Component Status that users wish to view. Users can also edit the Funding Component Status or discontinue it by clicking on the Show link associated with it on the Action Column.

IB IBA Worksheet.

Figure 28:
FIG. 28 depicts a screen shot of an exemplary IBA Worksheet.

The IBA Worksheet will enable Oversight Agency users with IB Data Admin Module role to associate funding components to an Individual, and specify amount, date range and comments. To create an IBA Worksheet, from their Unified Dashboard (Oversight Account), Users click on the IBA Worksheet link under the IBA Worksheet section of Individual Budgeting module. Users will be taken to the Individual List page. Users select the Individual for whom users want to create an IBA Worksheet from the list. Then users will be taken to the IBA Worksheet page. Users may also filter out the Individual's name by specifying the name in the Individual Name field. If users enter the first few letters of the Individual Name, an auto complete list will appear showing possible matches. Users can select the particular Individual Name from the list and click on the 'Search' button to filter out. If an Individual has more than one approved Budget then the IBA Amount and Applicable IBA of the last approved Budget will appear under the IBA Worksheet. The Utilization Rate (%) field has been added under the IBA Worksheet section. On the IBA Worksheet page, IBA Amount and Applicable IBA from the last approved budget of the Individual are displayed. Users can add funding components in the IBA Worksheet Component section by clicking on the 'Add Funding Component' button located at the bottom right corner of the page. Users can also edit the existing components by clicking on the Edit link associated with each one in the row under the Action column (FIG. 28). After clicking on the 'Add Funding Component' button, users will be taken to the IBA Worksheet Component page. Users enter information in the appropriate fields under the IBA Worksheet Component section and then click on the 'Done' button located at the bottom right corner of the page. This will take users back to the IBA Worksheet page. In addition, users may add negative values in the Amount field and amounts with negative value will appear in parenthesis. Users will see a warning statement saying "This section has been modified but not saved" on the IBA Worksheet page. To save the change, users can click on the 'Save' button located at the bottom right corner of the page. If the IBA Worksheet was updated previously, users will see the Update History link at the top of the pages. Clicking on it will show the update history.

IB Billing Document.

Figure 26:
FIG. 26 depicts a screen shot of an exemplary page to create an IB Billing Document.

Linked Provider Users are required to have the IB Provider Data Admin Module role to create and access a Billing Document. Linked Provider users will be able to create a Billing Document for Service Authorization(s) which has been sent to them by Oversight Agency. Provider Administrators or Users with 'User' Administrative role can enable the IB Provider Data Admin Module role for their accounts (FIG. 25). To create a Billing Document, users click on the Create Billing Document link for IB Provider Data Admin under the Individual Budgeting section from the Individual tab on their Dashboard. This will take users to the Create IB Billing Document page. On this page, Users enter a unique Claim Number, Service Provider Code, Billing Month and select the Oversight Provider. Then users click on 'Next'. Users will receive an error message for the Service Provider Code stating 'Service Provider not found with the code' after clicking on 'Next', if the Service Provider is not mapped with the Linked Provider from the Oversight end. Clicking on 'Next' will take users to the page where users may enter the Authorization Number. Users can select the Authorization Number from the auto-populated list and click on 'Next'. To have the Authorization Number field auto-populate, the Authorization number must be assigned by the Oversight Agency and the Service Authorization must be sent to the Linked Provider. This will add the Service Authorization information on the Billing document. Users can click on the 'Save' button to save the information (FIG. 26). A success message of Successfully Saved Billing Document will be generated on saving the Billing Document.

Users can click on the Billing Document List link for IB Provider Data Admin under the Individual Budgeting section from the Individual tab on their Dashboard. This will take users to the IB Billing Document List page. Users click on the Show link to view the particular IB Billing Document. This will open the IB Billing Document page where users may fetch the Service Consumption record using the 'Fetch' button at the bottom of the page. Clicking on the 'Fetch' button will display the Service Consumption record(s). Users can select the Service Consumption record for the IB Billing Document and click on the 'Save' button. A success message of Successfully Saved Billing Document will appear on saving the IB Billing Document. Users may click on the 'Edit' button at the bottom of the IB Billing Document page to edit the IB Billing Document Information. This will allow users to select a different Service Authorization sent by the Oversight agency and different Service Consumption record(s) (FIG. 27). Only Service Consumption records accepted by the Oversight agency will appear under the Service Consumption(s) column on the IB Billing Document page. Users can click on the 'Save' button to save the changes.

Create New Billing Data for Linked Providers.

Figure 24:
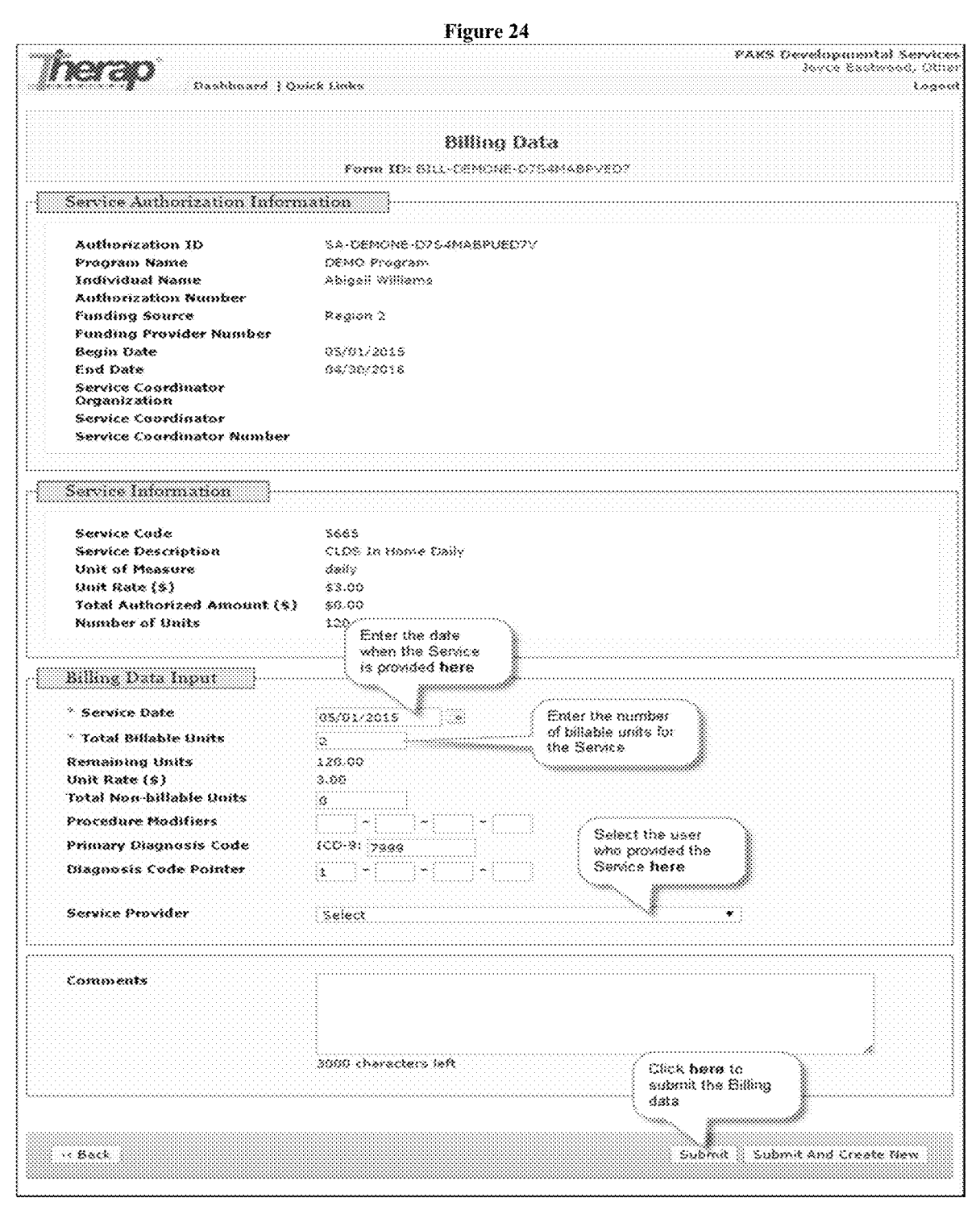

To generate Billing data, Users click on the New link, in the Billing Data row on the Professional Claim section under the Billing tab of their Dashboard (FIG. 15). In the Search Service for New Billing Data page, users enter the appropriate search parameters. For the Individual Name field, typing in the first few letters of the name will show a drop-down list with names that match the entered name. Users can click on the correct name from the list. The search result will be displayed according to the search parameters. At the Billing Data page, users enter all appropriate information in the 'Billing Data Input' section, the fields marked with a red asterisk (*) are required (FIG. 24). When users have completed entering the information, users can click on the 'Submit' button.

Creating Billing Provider—for Linked Providers.

From the Dashboard, users click on New in the same row as Billing Provider under Billing, which can be viewed in the Admin tab (FIG. 23). In the Billing Provider page, users can enter information in all fields marked with asterisks (*). Users can enter the ID Types as EIN (Employer's Identification Number) Number. The EIN Number must be the same as the Provider Code of the Service Provider. Users will find the Provider Code on the IB Service Authorization sent to users by the State Agency. On the Billing Provider form, users may select the 'Employer's Identification Number' option for ID Type and enter the Provider Code found on the IB Service Authorization to the ID Number field. Users may enter NPI Number and Provider Commercial Number if appropriate. Alphanumeric values (consisting of or using both letters and numerals) can be entered in the NPI Number field. Users can enter Provider Address as appropriate; P.O. Box number is not required for the Provider address. The ZIP field accommodates 9 digit zip codes. A Warning message is displayed if the ZIP code entered is not 9 digits long. Users also can enter Contact Information and other details of the Provider as appropriate. Once users have entered all the information, users simply click on the 'Save' button to save the form.

Creating New Service Description Code for Linked Providers.

Figure 16:
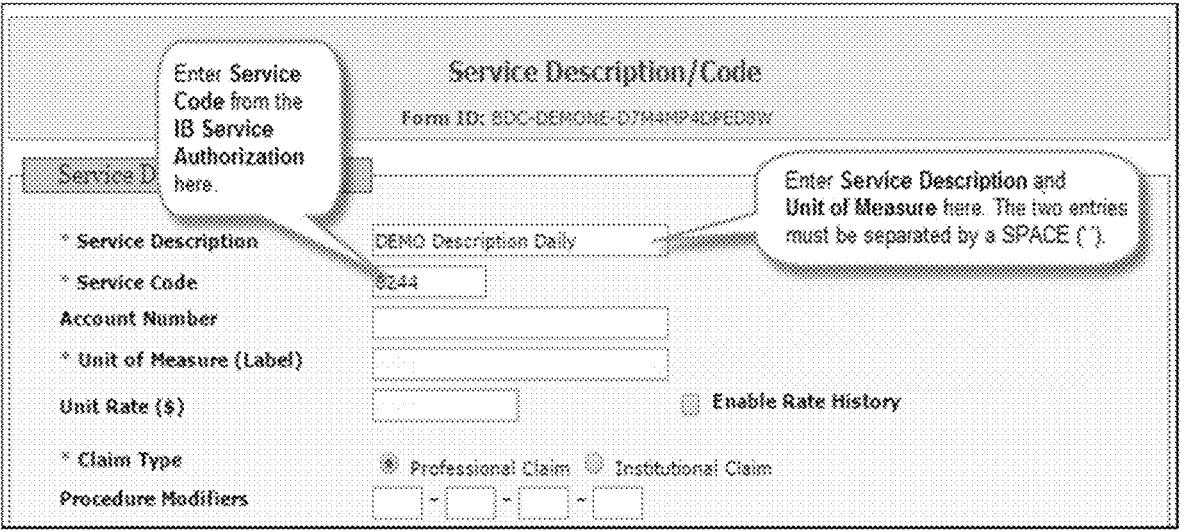
FIG. 16 depicts another screen shot of an exemplary Service Description/Code page.

In the Dashboard, users click on the New link in the same row as Description/Code under Billing in the Admin tab. On the Service Description/Code page, users enter the Service Description by inserting the non-numeric part of the Service specified on the IB Service Authorization (for example, 'DEMO Description' from '8244—DEMO Description'), followed by a space and then enter the Unit of Measure specified on the IB Service Authorization. Users then enter the Service Code from the numeric part of the Service specified on the IB Service Authorization (for example, '8244' from '8244—DEMO Description') (FIG. 16). Users may select the appropriate Claim Type and all other fields marked with a red asterisk (*). Users then select the Method of Data Collection as specifying by their agency. If users select the 'Attendance' option, users can also select the appropriate Attendance Type that will used to record Attendance. Once users have entered the appropriate information they can click on the 'Save' or 'Save and Create New' button as appropriate.

IB Oversight Agency Accepting Unit Consumption Submitted by the Linked Provider Users.

Figure 22:
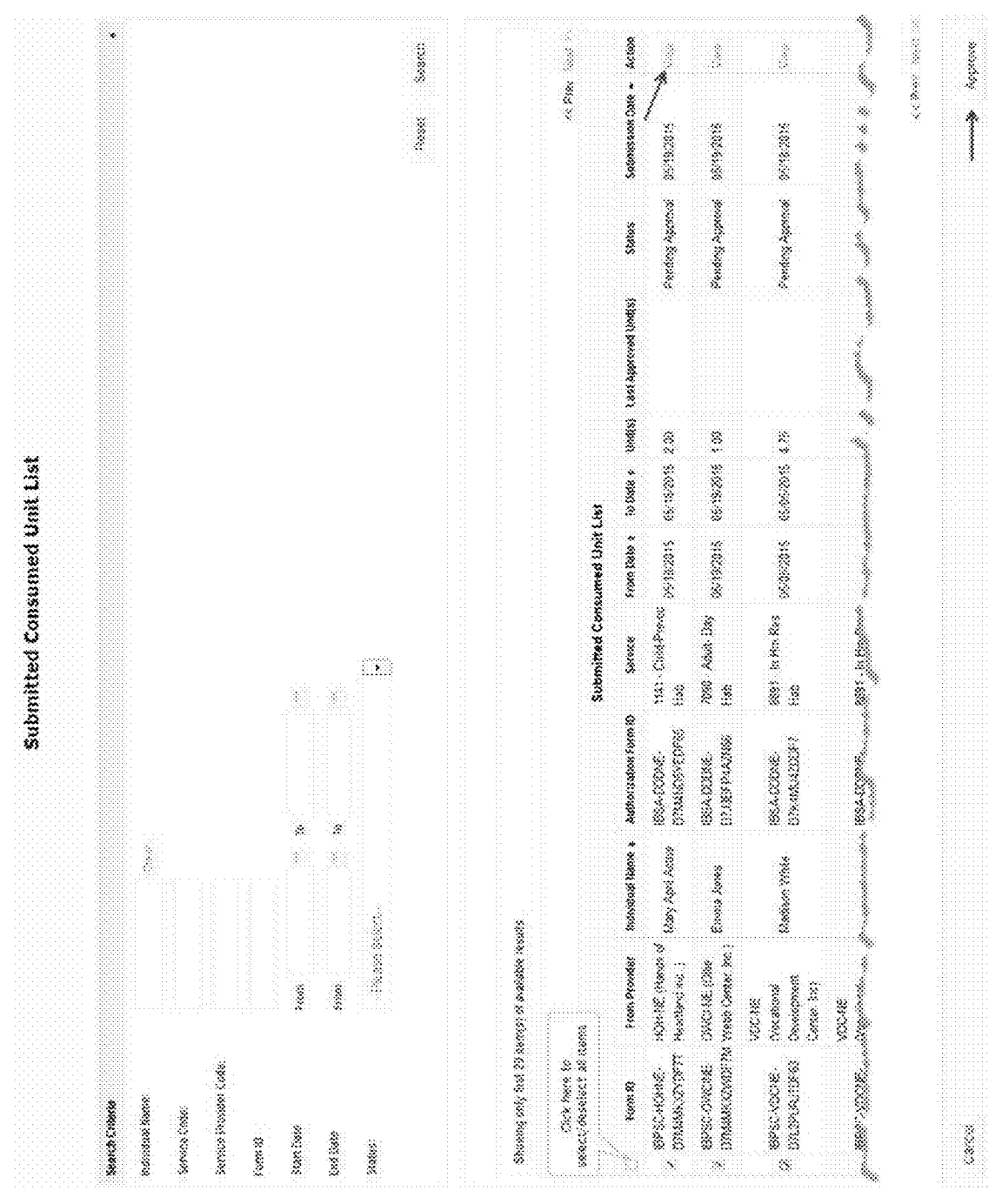

For oversight agency accepting unit consumption submitted by the Linked Provider users, once recorded service consumption has been submitted to the Oversight Agency for approval, the Submitted Units link with a count will appear under the To Do tab on Dashboard for the Oversight user. Users click on the Submitted Units link under the Individual Budgeting section on Unified Dashboard. Then users will be taken to the Submitted Consumed Unit List page. After clicking on the View link in a particular row under the Action Column from the Submitted Consumed Unit List page, users will be taken to the Submitted Consumed Unit(s) page. Users may also select and approve all submitted consumed unit by selecting the checkbox beside the Form ID column and then click on the 'Approve' button at the bottom of the Submitted Consumed Unit List page (FIG. 22). Users may click on the 'Approve' button located at the bottom of the Submitted Consumed Unit(s) page to accept the submitted consumed unit(s). Users may enter their comments while accepting or rejecting used units submitted by Linked Provider users. These comments can be viewed by the Linked Provider users who submitted the used units and can be referred to by the users while re-submitting the used units. Users may reject the submitted consumed units by clicking on the 'Reject' button. This will change the status of the submitted consumed units as rejected. A message of Consumption Unite(s) exceeded the total monthly allocation will be shown on the Submitted Consumed Unit(s) page if the units used exceeded the total monthly allocation. By clicking on the 'Approve with Exceeded Unit(s)' button located at the bottom of the page, users will be able to accept the used submitted units. A confirmation message of Successfully Approved Service Consumption will appear on the Submitted Consumed Unit List page after the successful approval of the Service Consumption record.

Updated IB Share of Cost.

Users with the IB Data Admin role will be able to update IB Share of cost for an Individual by clicking on the List link beside the IB Share of Cost option under the Individual Budgeting section from the Individual tab on their Dashboard. Users will be taken to the Share of Cost List page. From the Search section, users may search for the Share of Cost by entering the Individual name, month or year. From the 'Share of Cost List' section, users may also click on the Show link under the Action column. Users will be taken to 'Share of Cost' page of the Individual. To update the Share of Cost, users can enter the new amount in the 'Amount' field and click on the 'Update' button. To edit the customer obligation, users may click on the Edit link under the Action column, then enter the new amount and click on the 'Save' button (FIG. 21). If the Customer Obligation Amount for a particular month is edited, all claims that were submitted that month and are in 'Sent', 'Paid', and 'Paid Adjusted' status will change to 'Billable' Status. The Patient Responsibility Amount ($) of these claims will change to the updated Customer Obligation Amount. The claims will then be automatically re-sent to the Payer.

Submit Service Consumption and Billing Claim for Linked Providers.

For view and submit service consumption, after users have submitted Billing Data to record services provided, the system will automatically generate a claim and use that claim to record a Service Consumption. The Service Consumption will be automatically submitted to the Oversight Agency for approval (FIG. 19). Before the consumed service units are approved, the Service Consumption form and the Claim will remain in 'Pending Approval' status (FIG. 20). After the Service Consumption has been approved by the Oversight Agency, then the status of the Service Consumption will change to 'Approved'. The status of the submitted claim will change to 'Billable'. Then the claim will be submitted to the Payer (NFOCUS). For marking a 'Sent' claim as 'Paid', if users have received the amount that was claimed for the service, users may mark this claim as 'Paid'. To do so, users can search for the claim that is in 'Sent' status and update the claim status to 'Paid' on claim form. Users can click on the Search link beside the Professional Claim under the 'Billing' tab of the Dashboard. On the search page, users enter the search parameters as appropriate. The search result will be displayed based on the search parameters provided. Users can click on the appropriate Claim ID to view the claim form and select the claim that users want to mark as 'Paid'. On the claim form, users can scroll down towards the bottom of the claim form and click on the 'Update Status' button. This will open the Claim Status and Amount Update page. Users then select the status as Paid from the New Status field and the claim status will change to 'Paid'.

Delete Service Authorizations with Consumed Units for Oversight and Linked Providers.

If a Service Authorization has consumed services, it cannot be deleted unless the consumed units are changed to zero. A message of Service Authorization cannot be deleted as non-zero Approved Consumption found will appear. To do so, the Linked Provider can force any previous paid claims to zero units and send the pending service consumptions recorded to the Oversight Agency for approval. After the Oversight Agency approves the zero-ed service consumptions, the Service Authorization will no longer contain any Service Consumptions and can be deleted.

For Linked Providers to Resend 'Paid' or 'Paid-Adjusted' Claims with Zero Units and to resubmit a claim in 'Paid' status, users can click on the Search link under the Billing tab of the Dashboard, then search and open the Claim form users want to submit. Users may search the claim by selecting Paid as a parameter from the Claim Status field in the Claim search form. Users can scroll down towards the bottom of the claim form and click on the 'Update for Replacement' button (located towards the bottom of the form). After the claim form is reloaded on screen, users click on the 'Update' button at the bottom. On the success message that appears, users click on the 'Back to the Claim Form' link. The status of the claim will change to 'Updating'. Note that the Claim Frequency Type Code has been changed to '7-Replacement (Replace of Prior Claim)'. For Linked Providers in certain regions, such as, for example, Nebraska, only claims of this type can be submitted as replacement claims. For claim forms in 'Updating' status, users will be able to edit the Billing Data to review any information contained within, such as Total Billable Units. Users can click on the link below Billing Data ID under the 'Service Lines' section to open the Billing Data form and make the appropriate changes. To apply the changes, users can click on the 'Update' button. On the claim form, users click on the 'Submit for Approval' button at the bottom to resubmit for approval. A success message of The form has been Successfully Submitted will be displayed to confirm the claim submission. The status of the claim will change to 'Pending Approval'. The Service Consumption recorded from the claim for the Linked Provider will also contain zero units.

For Oversight Provider to Approve the Service Consumption(s) with Zero Units, once the recorded service consumption has been submitted to the Oversight Agency for approval, as an Oversight user, users can access the service consumptions by clicking on the Submitted Units link under the Individual Budgeting section on Unified Dashboard. On the Submitted Consumed Unit List page, users click on the checkbox beside the Service Consumption sent with zero units. Then users scroll down to the bottom of the page and click on the 'Approve' button to accept the submitted consumed unit. A success message of Successfully Approved Service Consumption(s) will appear at the top of the page. For Oversight Provider to Delete Service Authorization, after the Service Consumption with zero units has been approved, users can go to the individual's Budget form. The Service Unit that was previously listed has been removed. Users can click on the Delete link indicated. Users then click on the 'Delete' button at the bottom. If the Service Authorization has been deleted, the following success message of Successfully Deleted Service from the Budget with Authorization Form ID will appear, confirming the action.

Resubmit Rejected 'Sent' Claims—for Linked Providers.

Users may resubmit a claim in 'Sent' status for claims that were rejected by NFOCUS and claims that were rejected by the Oversight Agency and needs to be readjusted. In order to resubmit a claim in 'Sent' status, users click on the Search link in the Billing tab of the Dashboard and search for and open the Claim form users want to submit (FIG. 30). Users may also search the claim by selecting Sent as a parameter from the Claim Status field in the Claim search form. Then users scroll down towards the bottom of the claim form and click on the 'Update Status' button. Clicking on the 'Update Status' button will open the Claim Status and Amount Update page. Users select the status as Paid from the New Status field. Once the status of the claim has been changed, users click on the 'Update for Replacement' button (located towards the bottom of the form). After the claim form is reloaded on screen, users click on the 'Update' button at the bottom. When the success message of The form has been Successfully Updated appears, users click on the 'Back to the Claim Form' link. The status of the claim will change to 'Updating'. Note that the Claim Frequency Type Code has been changed to '7-Replacement (Replace of Prior Claim)'. For Linked Providers in a country, state, or city, such as, for example, Nebraska, only claims of this type can be submitted as replacement claims. For claim forms in 'Updating' status, users will be able to edit the Billing Data to review any information contained within, such as Total Billable Units. Users can click on the link below Billing Data ID under the 'Service Lines' section to open the Billing Data form. On the Billing Data form, users can make the appropriate changes and click on the 'Update' button. On the claim form, users click on the 'Submit for Approval' button at the bottom to resubmit for approval. A success message of The form has been Successfully Submitted will be displayed on the following page to confirm the claim submission. The status of the claim will change to 'Pending Approval'.

Resubmit Claims in 'System Rejected' and 'Service Coordinator Rejected' Status.

Figure 29:
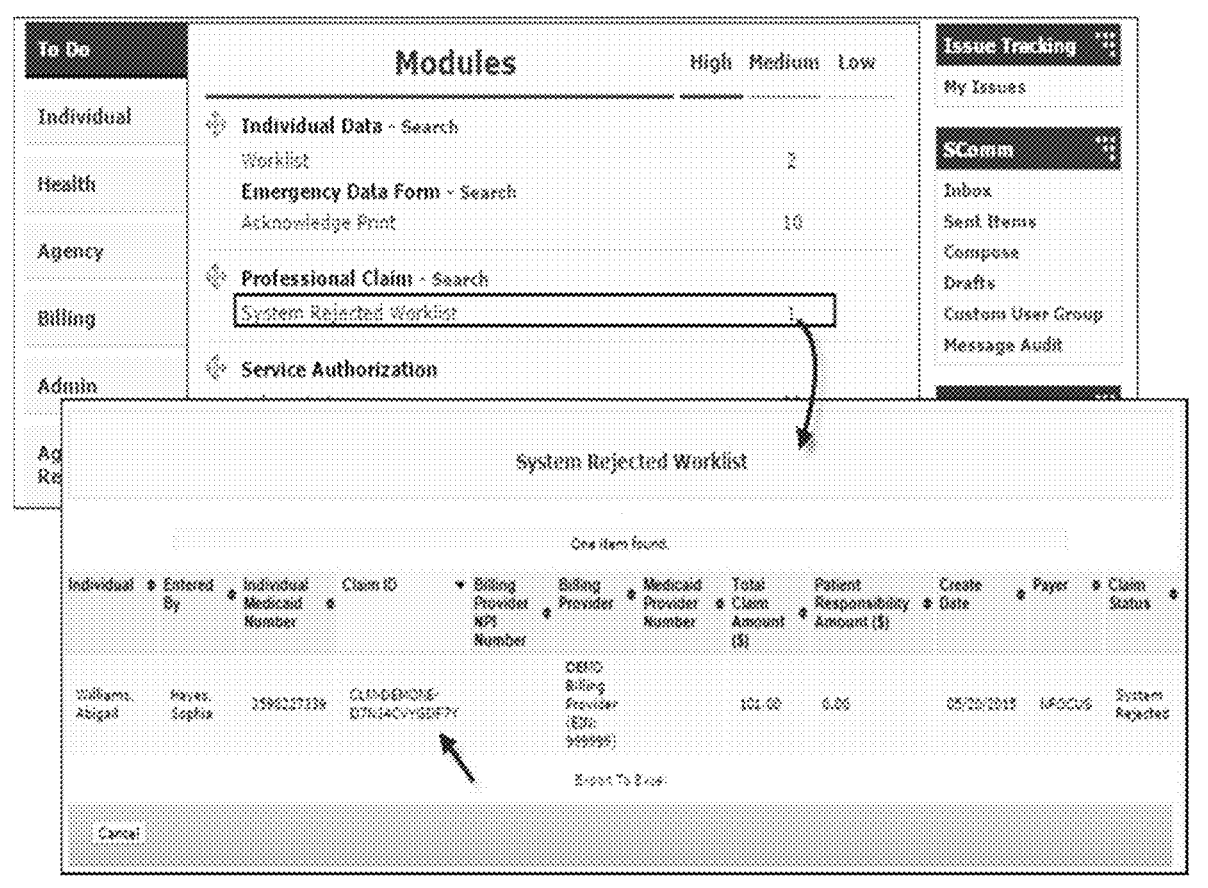

A submitted claim containing the Billing Data users have entered may not be recorded as a Service Consumption for the reason that before the claim was generated by the system, the Service Authorization may have been updated and needs to be Acknowledged by the Linked Provider or before the claim was generated by the system, the Service Authorization may have been deleted by the Oversight agency. To check whether there are any claims that are in 'System Rejected' status, users can go to the To do tab of the Dashboard. If there are claims of this status, a 'System Rejected Worklist' notification will appear under the Professional Claim section of the To Do tab. To access these claims, users click on the number beside 'System Rejected Worklist' and select the claim to update on the following page (FIG. 29).

For claim forms in 'System Rejected' status, users will be able to edit the Billing Data to review any information contained within if necessary, such as Total Billable Units. Users then click on the link below Billing Data ID under the 'Service Lines' section to open the Billing Data form. On the Billing Data form, users can make the appropriate changes and click on the 'Update' button. On the claim form, users click on the 'Submit for Approval' button at the bottom to resubmit for approval. A success message of The form has been Successfully Submitted will be displayed on the following page to confirm the claim submission. The status of the claim will change to 'Pending Approval'. Claims with status 'Service Coordinator Rejected' are generated when Service Coordinators on the Oversight Agency rejects the submitted Service Consumption recorded by the Linked Provider. These claims can be updated further to meet the requirements of the Oversight Agency.

To check whether there are any claims that are in 'Service Coordinator Rejected' status, users can go to the To do tab of the Dashboard. If there are claims of this status, a 'Service Coordinator Rejected Worklist' notification will appear under the Professional Claim section of the To Do tab. To access these claims, users click on the number beside 'Service Coordinator Rejected Worklist' and select the claim to update on the following page. For claim forms in 'Service Coordinator Rejected' status, users will be able to edit the Billing Data to review any information contained within, such as Total Billable Units. Users then click on the link below Billing Data ID under the 'Service Lines' section to open the Billing Data form. On the Billing Data form, users can make the appropriate changes and click on the 'Update' button. On the claim form, users click on the 'Submit for Approval' button at the bottom to resubmit for approval. A success message of The form has been Successfully Submitted will be displayed on the following page to confirm the claim submission. The status of the claim will change to 'Pending Approval'.

The medical claims are then routed to the appropriate service coordinator for approval.

If the claims are approved, they are sent to the designated service coordinator for approval. If disapproved, the claims are returned to the provider with an explanation of the rejection. If approved, the claims are sent to the state Medicaid and Medicare Information System (MMIS).

The state, individual, case manager and circle of support can have real time access to the utilization data, based on caseloads and roles, to monitor services and forecast future needs.

Oversight users may create a non-specialized provider for any unmapped Service Provider. The 'Service Provider' information will automatically populate on to the fields on the 'NE Non Specialized Provider' page. Users can select an unmapped service provider from the Service Provider List page (FIG. 31). On the Service Provider page, users then click on the 'Create Non-Specialized Provider' link under the 'Service Provider Information' section (FIG. 32). On the NE-Non Specialized Provider page, the fields, Provider Code, Provider Name and Login Name, are not editable. Users may edit the rest of the fields and complete the set up. Users click on the Complete Setup button on the bottom of the form to create a non-specialized provider.

Download EOB Report:

Electronic Remittance Advice (ERA), or Remittance 835, is an electronic transaction which provides claim payment information in the HIPAA mandated ACSX12 005010X221A1 format. These files are used by practices, facilities, and billing companies to autopost claim payments into their systems To download an Explanation of Benefits (EOB), users can click on the Search option beside the 853 Remittance Section from the Billing tab on the Dashboard (FIG. 30). On the Remittance 835 Search page, users can select an appropriate date range and click on the Search button. On the next page, users click on a file name to open the file. Users will be taken to the Remittance 835 Page. Users then click on the CSV Report/PDF Report/Text Report button to download the report. Users can also open the downloaded file to view the report in PDF, CSV or Text format (FIG. 33).

The present invention is not limited to the above-mentioned embodiments and various modifications are considered without departing from the technical concept of the present invention.

What is claimed is:

1. A HIPAA-compliant computer security method of sharing service, budget, and billing information associated with personal health information of one or more individuals among at least a first organization and a second organization in an integrated manner, and preventing unauthorized access to the billing information, the method comprising:

a. receiving by one or more physical nodes a first request for authorization for a user in the first organization to access service and budget information in the second organization pertaining to personal health information of one or more individuals, wherein the first organization is associated with a first security domain, the second organization is associated with a second security domain, the second organization has an access profile associated with the first security domain, the user is associated with one or more roles and one or more caseloads, the service and budget information for each of the one or more individuals having at least one type, the one or more roles includes access privilege information for one or more users, and the one or more caseloads includes access privilege information for at least one individual or medical services program associated with said individual's personal health information;

b. logging by the one or more physical nodes, in an activity log associated with at least the first organization or the second organization, the user's first request for authorization for the user in the first organization to access service and budget information in the second organization pertaining to the one or more individuals;

c. determining by the one or more physical nodes whether the user in the first organization is authorized to access service and budget information in the second organization pertaining to the one or more individuals, wherein the determination is based on at least the access profile, the one or more caseloads and the one or more roles associated with the user and the type of service and budget information in the second organization pertaining to the one or more individuals and associated with said individual's personal health information;

d. responsive to determining that the user in the first organization is authorized to access service and budget information in the second organization pertaining to the one or more individuals:
   i. transferring by the one or more physical nodes the service and budget information in the second organization pertaining to the one or more individuals in compliance with HIPAA, and;
   ii. logging by the one or more physical nodes, in the activity log, the transferring of service and budget information in the second organization pertaining to the one or more individuals to the user in the first organization in compliance with HIPAA; and
   responsive to determining that the user in the first organization is not authorized to access service and budget information in the second organization pertaining to the one or more individuals, preventing the requested access in compliance with HIPAA; and e. receiving, by one or more physical nodes, information pertaining to services provided to the one or more individuals by the first organization and billing information generated by the first organization pertaining to the provided services.

2. The method of claim 1, further comprising the step of establishing a budget and service plan for the one or more individuals.

3. The method of claim 1, wherein the second organization provides a service authorization to the first organization prior to step (a).

4. The method of claim 1, further comprising step (f) of generating claims for payment from the information pertaining to billing for services provided to the one or more individuals.

5. The method of claim 4, further comprising step (g) of submitting said claims for payment to at least one payor.

6. The method of claim 1, wherein the user is a doctor, health care professional, case manager, or staff person of the first or second organization.

7. The method of claim 1, wherein the first organization is an independent provider.

8. The method of claim 7, wherein the independent provider is a user providing non-specialized services.

9. The method of claim 1, wherein the one or more physical nodes include one or more computers.

10. The method of claim 1, wherein the one or more physical nodes are at least two physical nodes that are not identical and operate independently of each other.

11. The method of claim 1, wherein the one or more physical nodes include one or more storage arrays.

12. The method of claim 1, wherein the one or more physical nodes include one or more physical disc drives.

13. A HIPAA-compliant computer security system for sharing service, budget, and billing information associated with personal health information of one or more individuals among at least a first organization and a second organization in an integrated manner, and preventing unauthorized access to the billing information, the system comprising:
   a. means for receiving by one or more physical nodes a first request for authorization for a user in the first organization to access service and budget information in the second organization pertaining to personal health information of one or more individuals, wherein the first organization is associated with a first security domain, the second organization is associated with a second security domain, the second organization has an access profile associated with the first security domain, the user is associated with one or more roles and one or more caseloads, the service and budget information for each of the one or more individuals having at least one type, the one or more roles includes access privilege information for one or more users, and the one or more caseloads includes access privilege information for at least one individual or medical services program associated with said individual's personal health information;
   b. means for logging by the one or more physical nodes, in an activity log associated with at least the first organization or the second organization, the user's first request for authorization for the user in the first organization to access service and budget information in the second organization pertaining to the one or more individuals;
   c. means for determining by the one or more physical nodes whether the user in the first organization is authorized to access service and budget information in the second organization pertaining to the one or more individuals, wherein the determination is based on at least the access profile, the one or more caseloads and the one or more roles associated with the user and the type of service and budget information in the second organization pertaining to the one or more individuals and associated with said individual's personal health information;
   d. means for responding to a determination that the user in the first organization is authorized to access service and budget information in the second organization pertaining to the one or more individuals said means comprising:
      i. means for transferring by the one or more physical nodes the service and budget information in the second organization pertaining to the one or more individuals in compliance with HIPAA; and ii. means for logging by the one or more physical nodes, in the activity log, the transferring of service and budget information in the second organization pertaining to the one or more individuals to the user in the first organization in compliance with HIPAA; and means for responding to a determination that the user in the first organization is not authorized to access service and budget information in the second organization pertaining to the one or more individuals by preventing the requested access in compliance with HIPAA; and e. means for receiving, by one or more physical nodes, information pertaining to services provided to the one or more individuals by the first organization and billing information generated by the first organization pertaining to the provided services.

14. The system of claim 13, further comprising a means to establish a budget and service plan for the one or more individuals.

15. The system of claim 13, further comprising a means for providing a service authorization to the first organization.

16. The system of claim 13, further comprising a means for generating claims for payment from the information pertaining to billing for services provided to the one or more individuals.

17. The system of claim 13, further comprising a means for submitting said claims for payment to at least one payor.

* * * * *